United States Patent
Ovadia et al.

(10) Patent No.: US 11,182,222 B2
(45) Date of Patent: Nov. 23, 2021

(54) METHODS AND APPARATUS FOR MULTI-PROCESSOR DEVICE SOFTWARE DEVELOPMENT AND OPERATION

(71) Applicant: Charter Communications Operating, LLC, St. Louis, MO (US)

(72) Inventors: Shlomo Ovadia, Denver, CO (US); Michael Kloberdans, Brighton, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/523,847

(22) Filed: Jul. 26, 2019

(65) Prior Publication Data

US 2021/0026711 A1    Jan. 28, 2021

(51) Int. Cl.
*G06F 9/54*    (2006.01)
*H04L 29/06*    (2006.01)

(52) U.S. Cl.
CPC .............. *G06F 9/541* (2013.01); *H04L 67/40* (2013.01); *H04L 69/16* (2013.01)

(58) Field of Classification Search
CPC . H04L 69/16; H04L 67/40; G06F 9/54; G06F 9/541
See application file for complete search history.

(56) References Cited

U.S. PATENT DOCUMENTS

| 5,793,410 A | 8/1998 | Rao |
| 5,995,499 A | 11/1999 | Hottinen et al. |
| 6,154,648 A | 11/2000 | Comer |
| 6,216,152 B1 | 4/2001 | Wong et al. |

(Continued)

FOREIGN PATENT DOCUMENTS

| CA | 2546598 C | 12/2011 |
| CA | 3097140 A1 | 10/2019 |

(Continued)

OTHER PUBLICATIONS

Dual Channel Wi-Fi Arris XB3 RDK-B—Integration and Operations Guide, WR-GL-DCW-ARRIS-XB3--V01-190513, 2019.

(Continued)

*Primary Examiner* — Tuan C Dao
(74) *Attorney, Agent, or Firm* — Gazdzinski & Associates, PC

(57) ABSTRACT

Apparatus and methods related to software architectures in a multiprocessor-based access device used in a content delivery and/or service provider network. In one embodiment, a software architecture is provided for a cable modem using a first type of digital processor (e.g., RISC core or similar), and a second type of digital processor (e.g., multi-core CPU). In one variant, the RISC processor is used as a cable modem stack processor, and the CPU processor is used as an application processor. A Linux (e.g., OpenWrt)-based software architecture is used wherein software components placed on both processors can communicate to effectuate, e.g., configuration changes to the device (including the cable modem stack). A mechanism to establish communications between the two different processor domains and retrieve the requested information based on existing (e.g., RPC) protocols is also disclosed.

20 Claims, 16 Drawing Sheets

(56) References Cited

U.S. PATENT DOCUMENTS

| | | |
|---|---|---|
| 6,252,964 B1 | 6/2001 | Wasilewski et al. |
| 6,542,739 B1 | 4/2003 | Garner |
| 6,546,419 B1 | 4/2003 | Humpleman et al. |
| 6,594,699 B1 | 7/2003 | Sahai et al. |
| 6,728,269 B1 | 4/2004 | Godwin et al. |
| 6,757,837 B1 | 6/2004 | Platt et al. |
| 6,948,183 B1 | 9/2005 | Peterka |
| 6,968,364 B1 | 11/2005 | Wong et al. |
| 6,985,934 B1 | 1/2006 | Armstrong et al. |
| 7,058,964 B2 | 6/2006 | Khandelwal et al. |
| 7,068,597 B1 | 6/2006 | Fijolek et al. |
| 7,103,906 B1 | 9/2006 | Katz et al. |
| 7,159,230 B2 | 1/2007 | Manson et al. |
| 7,293,201 B2 | 11/2007 | Ansari |
| 7,324,003 B2 | 1/2008 | Yun |
| 7,487,534 B1 | 2/2009 | Peterka et al. |
| 7,552,450 B1 | 6/2009 | Evans et al. |
| 7,617,516 B2 | 11/2009 | Huslak et al. |
| 7,936,254 B2 | 5/2011 | McClenny et al. |
| 8,519,860 B2 | 8/2013 | Johnson et al. |
| 8,653,963 B2 | 2/2014 | Vallaire |
| 8,718,100 B2 | 5/2014 | Markley et al. |
| 8,719,847 B2 | 5/2014 | Agarwal et al. |
| 9,264,751 B2 | 2/2016 | Sarosi et al. |
| 9,479,404 B2 | 10/2016 | Ladd et al. |
| 9,699,663 B1 | 7/2017 | Jovancevic |
| 9,948,349 B2 | 4/2018 | Malach |
| 10,098,568 B2 | 10/2018 | Gazdzinski |
| 10,269,229 B2 | 4/2019 | Stern et al. |
| 10,452,342 B2 | 10/2019 | Triplett |
| 10,885,569 B2 | 1/2021 | Ogaz et al. |
| 10,966,073 B2 | 3/2021 | Petersen |
| 10,979,768 B2 | 4/2021 | Sarosi et al. |
| 10,991,227 B2 | 4/2021 | Stern et al. |
| 11,026,205 B2 | 6/2021 | Hmimy et al. |
| 2001/0049691 A1 | 12/2001 | Asazu |
| 2002/0032754 A1 | 3/2002 | Logston et al. |
| 2002/0038358 A1 | 3/2002 | Sweatt, III et al. |
| 2002/0078161 A1 | 6/2002 | Cheng |
| 2002/0080038 A1 | 6/2002 | Smith |
| 2002/0122040 A1* | 9/2002 | Noyle .................. G06T 1/20 345/522 |
| 2002/0122656 A1 | 9/2002 | Gates et al. |
| 2002/0174433 A1 | 11/2002 | Baumgartner et al. |
| 2003/0009567 A1 | 1/2003 | Farouk |
| 2003/0009769 A1 | 1/2003 | Hensgen et al. |
| 2003/0121054 A1 | 6/2003 | Lorenz |
| 2003/0158906 A1* | 8/2003 | Hayes ................... G06F 9/5027 709/211 |
| 2003/0204848 A1 | 10/2003 | Cheng et al. |
| 2003/0229899 A1 | 12/2003 | Thompson et al. |
| 2003/0231855 A1 | 12/2003 | Gates et al. |
| 2004/0001021 A1 | 1/2004 | Choo et al. |
| 2004/0003400 A1 | 1/2004 | Carney et al. |
| 2004/0034697 A1 | 2/2004 | Fairhurst et al. |
| 2004/0040041 A1 | 2/2004 | Crawford |
| 2004/0073944 A1 | 4/2004 | Booth |
| 2004/0078829 A1 | 4/2004 | Patel et al. |
| 2004/0103434 A1 | 5/2004 | Ellis |
| 2004/0107451 A1 | 6/2004 | Khandelwal et al. |
| 2004/0139177 A1 | 7/2004 | Yook |
| 2004/0143836 A1 | 7/2004 | McCormack et al. |
| 2004/0181800 A1 | 9/2004 | Rakib et al. |
| 2004/0181811 A1 | 9/2004 | Rakib |
| 2004/0187152 A1 | 9/2004 | Francis et al. |
| 2004/0230754 A1* | 11/2004 | Gumm ................... G06F 13/16 711/147 |
| 2004/0261114 A1 | 12/2004 | Addington et al. |
| 2004/0267965 A1 | 12/2004 | Vasudevan et al. |
| 2005/0027715 A1 | 2/2005 | Casey et al. |
| 2005/0050160 A1 | 3/2005 | Upendran et al. |
| 2005/0162267 A1 | 7/2005 | Khandelwal et al. |
| 2005/0289618 A1 | 12/2005 | Hardin |
| 2006/0055527 A1 | 3/2006 | Pugel |
| 2006/0084417 A1 | 4/2006 | Melpignano et al. |
| 2006/0161946 A1 | 7/2006 | Shin |
| 2006/0168159 A1 | 7/2006 | Weisman et al. |
| 2006/0184661 A1 | 8/2006 | Weisman et al. |
| 2006/0188004 A1 | 8/2006 | Kizu et al. |
| 2007/0004377 A1 | 1/2007 | Medford et al. |
| 2007/0022459 A1 | 1/2007 | Gaebel et al. |
| 2007/0156539 A1 | 7/2007 | Yates |
| 2007/0207771 A1 | 9/2007 | Bowser et al. |
| 2007/0237159 A1 | 10/2007 | Yamada et al. |
| 2008/0010506 A1* | 1/2008 | Tabei .................. G06F 11/0784 714/6.12 |
| 2008/0097913 A1 | 4/2008 | Dicks et al. |
| 2008/0126540 A1* | 5/2008 | Zeng ................... H04L 63/1458 709/225 |
| 2008/0313345 A1 | 12/2008 | Bernardin et al. |
| 2009/0064311 A1 | 3/2009 | Clark et al. |
| 2009/0163140 A1 | 6/2009 | Packham et al. |
| 2009/0307307 A1 | 12/2009 | Igarashi |
| 2009/0323516 A1* | 12/2009 | Bhagwan ............. H04L 41/0853 370/216 |
| 2010/0035610 A1 | 2/2010 | Narang et al. |
| 2010/0070630 A1 | 3/2010 | Ding |
| 2010/0094956 A1 | 4/2010 | Zuckerman et al. |
| 2010/0165947 A1 | 7/2010 | Taniuchi et al. |
| 2010/0202450 A1 | 8/2010 | Ansari et al. |
| 2010/0211793 A1 | 8/2010 | Park et al. |
| 2010/0219976 A1 | 9/2010 | Park et al. |
| 2010/0262722 A1* | 10/2010 | Vauthier ............. G06F 9/45558 710/8 |
| 2011/0014924 A1 | 1/2011 | Hwang et al. |
| 2011/0124335 A1 | 5/2011 | Martin et al. |
| 2011/0130112 A1 | 6/2011 | Saigh et al. |
| 2011/0191321 A1 | 8/2011 | Gade et al. |
| 2011/0210849 A1 | 9/2011 | Howard et al. |
| 2011/0270751 A1 | 11/2011 | Csinger et al. |
| 2011/0314462 A1* | 12/2011 | Clark ...................... G06F 8/65 717/169 |
| 2012/0079507 A1 | 3/2012 | Agarwal et al. |
| 2012/0122428 A1 | 5/2012 | Stephens, Jr. |
| 2012/0210793 A1 | 8/2012 | McCoy et al. |
| 2012/0287452 A1 | 11/2012 | Tsujimoto |
| 2012/0331096 A1 | 12/2012 | Yamaguchi et al. |
| 2013/0007413 A1* | 1/2013 | Thomson ............... G06F 1/3296 712/30 |
| 2013/0010686 A1 | 1/2013 | Shatzkamer et al. |
| 2013/0077554 A1 | 3/2013 | Gauvreau et al. |
| 2013/0109323 A1* | 5/2013 | Ruutu ................. H04W 52/0225 455/68 |
| 2013/0136089 A1 | 5/2013 | Gillett et al. |
| 2013/0174223 A1 | 7/2013 | Dykeman et al. |
| 2013/0191495 A1 | 7/2013 | Almstrand et al. |
| 2013/0201316 A1 | 8/2013 | Binder et al. |
| 2013/0219010 A1 | 8/2013 | Mahendran et al. |
| 2013/0238426 A1 | 9/2013 | Mukhopadhyay et al. |
| 2013/0258997 A1 | 10/2013 | Chen |
| 2013/0266179 A1 | 10/2013 | Jin |
| 2013/0298157 A1 | 11/2013 | Amsterdam et al. |
| 2014/0035182 A1* | 2/2014 | Boyer ................... B29C 64/393 264/40.1 |
| 2014/0106672 A1 | 4/2014 | Jeon |
| 2014/0139422 A1 | 5/2014 | Mistry et al. |
| 2014/0194068 A1 | 7/2014 | Coppage et al. |
| 2014/0215457 A1 | 7/2014 | Gava et al. |
| 2014/0282704 A1 | 9/2014 | Tumuluru et al. |
| 2014/0282802 A1 | 9/2014 | Bowler et al. |
| 2014/0308986 A1 | 10/2014 | Yang et al. |
| 2014/0354442 A1 | 12/2014 | Maity et al. |
| 2015/0026740 A1 | 1/2015 | Poder et al. |
| 2015/0052512 A1* | 2/2015 | Kostadinov ............... G06F 8/65 717/173 |
| 2015/0055623 A1 | 2/2015 | Li et al. |
| 2015/0058861 A1* | 2/2015 | Zheng ................... G06F 9/4887 718/104 |
| 2015/0120000 A1 | 4/2015 | Coffey et al. |
| 2015/0134970 A1* | 5/2015 | Jang ..................... G06F 21/572 713/176 |
| 2015/0156095 A1* | 6/2015 | Lu ........................ H04L 47/70 709/224 |

(56) References Cited

U.S. PATENT DOCUMENTS

| | | |
|---|---|---|
| 2016/0007138 A1 | 1/2016 | Palanisamy et al. |
| 2016/0013855 A1 | 1/2016 | Campos et al. |
| 2016/0073259 A1 | 3/2016 | Lee |
| 2016/0094421 A1 | 3/2016 | Bali et al. |
| 2016/0128072 A1 | 5/2016 | Rajagopal et al. |
| 2016/0174043 A1 | 6/2016 | Ko et al. |
| 2016/0174268 A1 | 6/2016 | Hu et al. |
| 2016/0212031 A1 | 7/2016 | Jain et al. |
| 2016/0259923 A1 | 9/2016 | Papa et al. |
| 2017/0026157 A1 | 1/2017 | Bugenhagen et al. |
| 2017/0094527 A1 | 3/2017 | Shattil et al. |
| 2017/0104644 A1 | 4/2017 | Ladd et al. |
| 2017/0111846 A1 | 4/2017 | Kang |
| 2017/0140286 A1 | 5/2017 | Basu et al. |
| 2017/0149937 A1 | 5/2017 | Ren et al. |
| 2017/0155703 A1 | 6/2017 | Hao et al. |
| 2017/0187966 A1 | 6/2017 | Getting |
| 2017/0208540 A1 | 7/2017 | Egner et al. |
| 2017/0316233 A1 | 11/2017 | Kherani et al. |
| 2018/0034524 A1 | 2/2018 | Pao et al. |
| 2018/0146058 A1 | 5/2018 | Somayazulu et al. |
| 2018/0199214 A1 | 7/2018 | Shen |
| 2018/0234403 A1 | 8/2018 | Casella et al. |
| 2018/0239425 A1 | 8/2018 | Jang |
| 2018/0300551 A1 | 10/2018 | Luccin et al. |
| 2018/0316563 A1 | 11/2018 | Kumar et al. |
| 2018/0343685 A1 | 11/2018 | Hart et al. |
| 2018/0351665 A1 | 12/2018 | Fukuta et al. |
| 2018/0351809 A1 | 12/2018 | Meredith et al. |
| 2018/0375887 A1 | 12/2018 | Dezent et al. |
| 2019/0037630 A1 | 1/2019 | Zhang et al. |
| 2019/0104033 A1 | 4/2019 | Carey |
| 2019/0109643 A1 | 4/2019 | Campos et al. |
| 2019/0124572 A1 | 4/2019 | Park et al. |
| 2019/0124696 A1 | 4/2019 | Islam et al. |
| 2019/0182895 A1 | 6/2019 | Di Girolamo et al. |
| 2019/0230613 A1 | 7/2019 | Kim |
| 2019/0319814 A1 | 10/2019 | Das |
| 2019/0320490 A1 | 10/2019 | Liu |
| 2019/0320494 A1 | 10/2019 | Jayawardene et al. |
| 2019/0349848 A1 | 11/2019 | Bali |
| 2019/0364492 A1 | 11/2019 | Azizi et al. |
| 2019/0379455 A1 | 12/2019 | Wang et al. |
| 2019/0394790 A1 | 12/2019 | Damnjanovic |
| 2020/0106678 A1 | 4/2020 | Grill et al. |
| 2020/0126551 A1 | 4/2020 | Xiong et al. |
| 2020/0178237 A1 | 6/2020 | Kakinada et al. |
| 2020/0186378 A1 | 6/2020 | Six et al. |
| 2020/0187150 A1 | 6/2020 | Eisner |
| 2020/0214065 A1 | 7/2020 | Tomala et al. |
| 2020/0228993 A1 | 7/2020 | Gunasekara |
| 2020/0281008 A1 | 9/2020 | Aboul-Magd et al. |
| 2020/0344515 A1 | 10/2020 | Wong et al. |
| 2020/0412565 A1 | 12/2020 | Sanders |
| 2021/0076424 A1 | 3/2021 | Mukherjee et al. |
| 2021/0084117 A1 | 3/2021 | Ovadia et al. |

FOREIGN PATENT DOCUMENTS

| | | |
|---|---|---|
| CN | 111989900 A | 11/2020 |
| EP | 1046259 A2 | 10/2000 |
| EP | 1769634 A2 | 4/2007 |
| EP | 3782341 A1 | 2/2021 |
| KR | 20160097917 A | 8/2016 |
| WO | WO-2004045125 A2 | 5/2004 |
| WO | WO-2005052766 A2 | 6/2005 |
| WO | WO-2019204165 A1 | 10/2019 |
| WO | WO-2021050957 A1 | 3/2021 |

OTHER PUBLICATIONS

Allen, et al., The Case for Run-Time Types in Generic Java, Rice University 2002 pp. 1-6.

Modem, such as e.g., the exemplary XB3 class of devices described In Dual Channel Wi-Fi Arris XB3 RDK-B—Integration and Operations Guide, WR-GL-DCWARRIS-XB3—V01-190513, Cable Television Laboratiores, Inc., 2019.

IEEE Std. 802.11 or related standards including 802.11 a/b/g/n/s/v/ac/ad/ax/ay/ba or 802.11-2012/2013, 802.11-2016.

W-Fi Direct (including inter alia, "Wi-Fi Peer-to-Peer (P2P) Specification"), Version 1.5, 2014, Wi-Fi Alliance, 90 pages.

* cited by examiner

```
docsis> cmstatus
The CM status is OPERATIONAL

*********************************************
***
*** Primary DS port 33  [OFDM]  frequency 759000000Hz
*** Locked/Active DS channels: 24/24 SC-QAM, 1/1 OFDM
*** Locked/Active US channels: 4/4 SC-QAM, 0/0 OFDMA
***
********************************************* docsis>
```

FIG. 4A

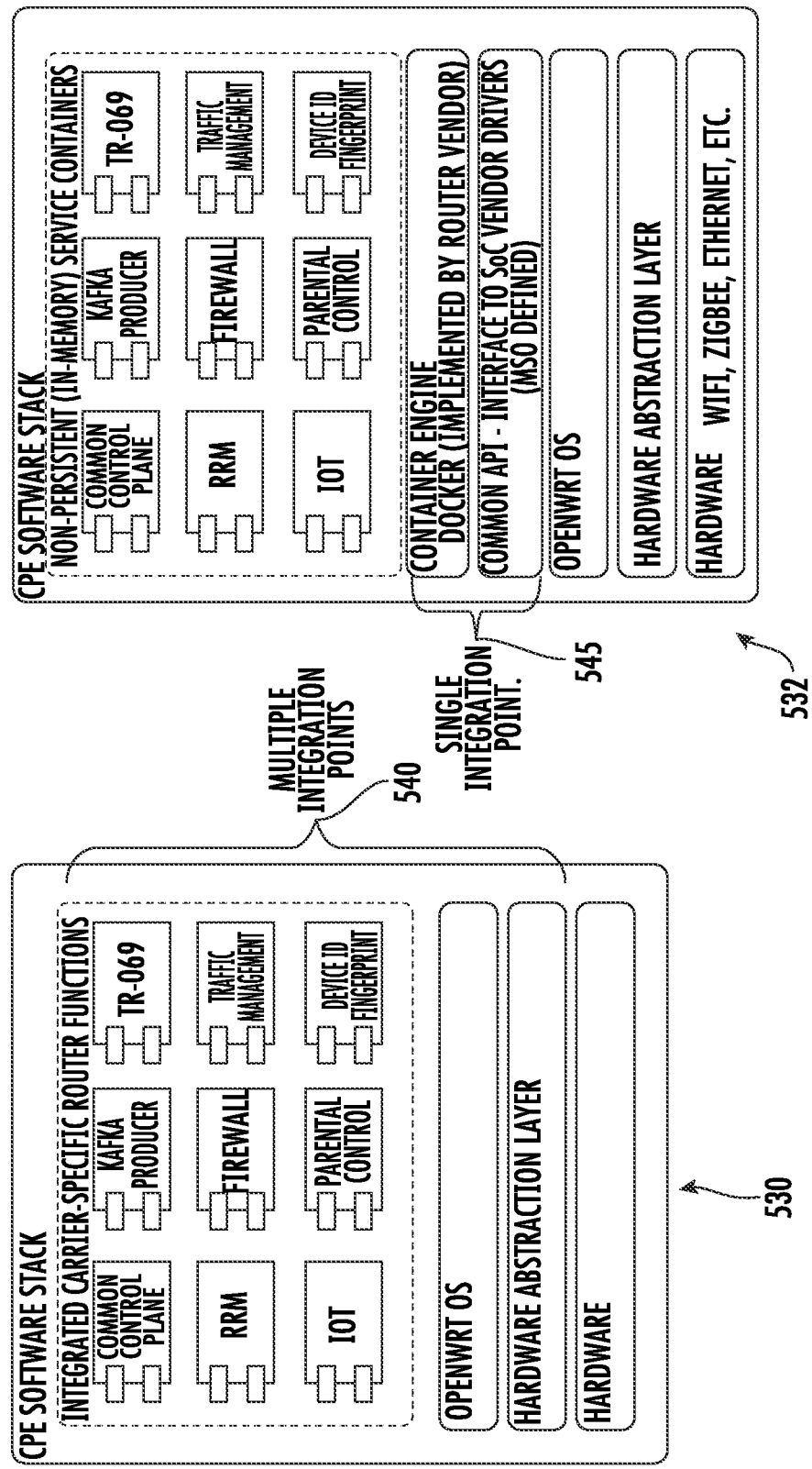

| COUGARMOUNTAIN | STATUS ▾ | SYSTEM ▾ | NETWORK ▾ | LOGOUT |
|---|---|---|---|---|

| STATUS | |
|---|---|
| SYSTEM | |
| FIRMWARE VERSION | 7.2.0.44.ER4_RC3 |
| CM STATUS | OPERATIONAL |
| MAC ADDRESS | 68:8f:2e:20:6f:64 |
| ACTIVE TX CHANNEL | 3 |
| ACTIVE RX CHANNEL | 16 |
| | |
| IPV6 DHCP INFO | |
| IPV6ADDRESS | 2001:172:16:31::4 |
| IPV6BOOTFILENAME | CM-688F2E5B6F64.cfg |
| IPV6PREFIX | EMPTY STRING FROM CM SIDE |
| IPV6ROUTER | 0:0:0:0:0:0:0:0 |
| IPV6TFTPSERVER | 2001:172:abc1:15:1::4 |
| IPV6TIMESERVER | 2001:172:abc1:15:1::6 |

| CPE LIST | |
|---|---|
| IPADDRESS | MACADDRESS |
| 172.16.64.221 | 68:8f:2e:5b:6f:65 |
| 0.0.0.0 | 14:91:82:3b:97:55 |

FIG. 6

“METHODS AND APPARATUS FOR
MULTI-PROCESSOR DEVICE SOFTWARE
DEVELOPMENT AND OPERATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present disclosure relates generally to the field of software architectures used on electronic devices such as modems, wireless access nodes, routers and gateways) used within data networks, and specifically in one exemplary aspect to the control, architecture and communication of multi-processor software and related services within such electronic devices.

2. Description of Related Technology

Electronic devices are ubiquitous within modern data networks and content distribution networks; e.g., those operated by an MSO (multiple systems operator), ISP (Internet service provider) or MNO (mobile network operator). Typical devices used in such networks (such as e.g., at a user or subscriber premises) include modems, routers, gateways, wireless access points, and mobile devices. Typically, a network provider (e.g., MSO) will provide a user with a modem (e.g., cable or DOCSIS-compliant modem) for use at the premises. These modems interface with the host network (e.g., the MSO's RF-based HFC network) for backhaul and delivery of data/content, and provide connectivity for other devices at the premises (e.g., to televisions, computers, WLAN APs, networking equipment, and user mobile devices, depending on configuration).

In the exemplary case of a cable modem, the device typically includes: (i) an RF "front end" for interface with the HFC network, and (ii) "back end" interfaces such as GbE, HDMI, DisplayPort, USB, IEEE Std. 802.11 (aka "Wi-Fi"), and wireless PAN (e.g., Bluetooth/BLE or IEEE Std. 802.15.4). FIG. 1 herein illustrates a block diagram of a typical modern DOCSIS cable modem (such as e.g., the exemplary XB3 class of devices described in "*Dual Channel Wi-Fi Arris XB*3 *RDK-B—Integration and Operations Guide,*" WR-GL-DCW-ARRIS-XB3-V01-190513, dated 2019 by Cable Television Laboratories, Inc., which is incorporated herein by reference in its entirety. As shown in FIG. 1, the exemplary cable modem device 100 includes an RF baseband SoC 101 with RISC processor 102 (e.g., an ARM-based solution such as an ARM7 or ARM8 core) as part of a baseband SoC including the PHY and MAC stacks 105, 107 for the RF interface 106, a host processor (e.g., multi-core CPU such as an Intel Atom), DOCSIS-based RF front end 106, a plurality of back-end network interfaces 110, memory (e.g., DDR DRAM with memory controller) 108, SRAM (not shown), bus controller/hub 112 (such as PCIe-based), and user interface(s) 114. It will be appreciated that while the terms "application processor" and "SoC/baseband processor" are used in the present discussion to refer to the RISC core and the term "host CPU" is used to refer to the e.g., Intel Atom or similar CISC device, these terms are merely conventions, and are in no way limiting. For instance, in some contexts, the CISC CPU may be referred to as an "applications processor," etc.

As a brief aside, CPUs (such as the host CPU 104 of FIG. 1) typically use a multi-processor architecture, which involves two or more central processing units (CPUs) or cores, with each one sharing common resources such as memory and peripherals. This multi-processor architecture facilitates simultaneous processing of programs within the kernel of the OS (operating system) of the host device (e.g., applications, reduced into thread blocks for execution on the various cores). The main purpose of using a multi-processor architecture is to increase processing speed, with other objectives being fault tolerance and application matching. Typically such multiple cores are operated in SMP configuration (symmetric multi-processing), although other approaches such as AMP (asymmetric multi-processing) may be utilized.

The Atom® line is Intel's family of x86 and x86-4 processors that are optimized for small computing devices, such as smartphones, Internet of things, notebooks, cable modems and many different electronic devices. The Atom processors are comparatively inexpensive and low in power consumption, and are commonly used in applications such as vehicle head units and cable modems, such as the XB3 architecture.

Hence, depending on context, the term "multi-processor" as used herein may refer to (i) common cores in a cluster (e.g., multiple cores within a common SoC, typically homogeneous in architecture and capability), or (ii) multiple (typically heterogeneous) cores of different SoCs.

Referring again to FIG. 1, in contrast with the host CPU 104, the baseband SoC with RISC core (e.g., ARM core processor) 101 is a processor based on RISC (Reduced Instruction set Computer) architecture, used in many of different electronic devices including in embedded applications. The ARM processor is smaller in size, and has reduced complexity and lower power consumption, which makes them suitable for increasingly miniaturized devices as well as other types of applications. In addition, the simplified design of ARM processor enables efficient multi-processor architecture and easier coding for the developer. However, in comparison to the host CPU 104, the RISC core 102 is much more limited in its capability/functionality, being architected and fabricated particularly for its designated functions (here, RF baseband processing). RISC architecture are advantageous over Complex Instruction Set Computer (CISC) processors in this regard (and for use in SoCs such as the baseband SoC 101 of FIG. 1) because they require less digital logic/gate count, and therefore less power and area. In particular, SoC processor cores often use the ARM processors because it is specified as an IP core (e.g., easy to modify and implement via a specific fabrication technology), and is more power efficient than Atom (x86) processors.

Software that runs on a typical host CPU such as that shown includes different components, e.g., middleware (for communication), the operating system (OS), and a hardware abstraction layer (HAL). HAL is typically located between the physical hardware and the OS and directly controls the processor and peripherals. For example, HAL includes context switching, drivers (e.g., bus drivers, Wi-Fi drivers, Ethernet drivers, etc.), configuration code for the memory management unit or MMU, and interrupt service routines (ISRs).

Conversely, the code set running on the RISC core 106 is typically greatly simplified, and includes the PHY and MAC layer functions 105, 106 necessary to support the RF front end (including coding, error correction, etc.) to support the more specialized operations of the baseband SoC and RF front end.

As such, the software stacks of the host CPU 104 and baseband SoC 101 (with RISC core 106) can, depending on the system architecture, operate effectively as logical "islands" within the prior art device 100; the processors utilize monolithic software stacks that are highly customized for the specific platform 100. In some cases, direct inter-processor (and inter-process) communication between the different processor environments and code spaces is non-existent, and as described in greater detail below, this lack of communication mechanisms can lead to significant disabilities especially with respect to (i) configuration of the device at time of deployment with e.g., end-users or subscribers, and (ii) reconfiguration or modification of the device after deployment.

Current OEM Integration Cycles

As alluded to above, current multi-processor software architectures such as those in the exemplary cable modem described supra are not well adapted to the developing, testing and launching of new devices, including those devices used by consumers or end-customers. For example, the developing, testing, and launching of new cable modem or DSTB devices and services currently requires long time cycles (e.g. about 2 years based on the experience of the Assignee). Specifically, each OEM vendor customizes its software and firmware to the specific target device, based on the SoC chip/chipset 101 vendor.

Moreover, each firmware version from each OEM vendor is required to pass full validation testing in the network operator (e.g., MSO) environment, and setup processes must be performed before the device will be ready for field deployment en masse. This further complicates and delays initial implementation as well as any subsequent configuration changes desired by the MSO.

In addition, as previously referenced with respect to FIG. 1, the client devices have multiple SoC processors (e.g., baseband SoC 101 and Host CPU SoC 104), with one processor (or cluster of cores) as the host/core processor 104 and the other processor (or cluster) as an application and/or packet processor 102. In some particular vendor implementations, the entire network interface (e.g., DOC SIS Cable Modem) software and firmware stack is supported by the RISC (e.g., ARM) processor 102 coupled with vendor proprietary firmware and software. As such, the Host CPU 104 does not actively support any CM functionality (all of it residing on the RISC SoC 101), and the proprietary vendor code is not modifiable except by the vendor, and even if modifiable, must be accessed through a developer's license which adds significant cost and complexity. Part and parcel thereof is the inability of the MSO (or other non-vendor) to modify individual functions of the stack(s); e.g., to customize directly.

Additionally, firmware feature management within a device such as that shown in FIG. 1 is often complicated (and comparatively high-cost) for a number of reasons, including that any update and management of one feature may impact the operation of other features within the stack.

Moreover, even when the extant proprietary CM stack firmware has been modified or configured by the vendor as desired by the MSO, it must be "flashed" to the device (i.e., a firmware update performed) as a whole.

Accordingly, there is a need for improved apparatus and methods for providing development, validation and testing for multiprocessor SoC configurations. Such improved apparatus and methods could ideally utilize existing firmware architectures developed by OEM vendors, yet provide a specific protocol and mechanism for enabling development and validation testing multi-processor SoCs (e.g. in cable modems, DSTBs, WLAN APs, Gateways, or other multi-processor devices commonly deployed by network operators or service providers). In addition, such improved apparatus and methods would define protocols for inter-processor communications in multiprocessor SoCs.

Ideally, these improved apparatus and methods would, inter alia, reduce the time and effort associated with development, testing, launching, and post-launch configuration changes of such devices significantly, including allowing for testing of (or changes to) individual functions or sets of functions with incipient or deployed devices directly by the network operator/service provider, thereby bypassing OEM-based testing/modification of their proprietary code.

SUMMARY OF THE INVENTION

The present disclosure addresses the foregoing needs by disclosing, inter alia, apparatus and methods for enhanced development, testing and configuration of multi-processor software architecture devices.

In a first aspect of the disclosure, a software architecture for use in a computerized device is disclosed. In one embodiment, the architecture includes: an OS having a plurality of components operative to execute on a first processor; a software layer having a plurality of components operative to execute on a second processor, the software layer being communicative with the OS via respective first and second agent processes. The OS executing on the first processor is used to provide a plurality of services, including to invoke a communications protocol between the first and second agent processes so as to obtain hardware data from the second processor.

In one variant, containers are utilized for the plurality of services to maintain abstraction between the services and the OS/processors.

In another aspect of the disclosure, a method for inter-processor communication is disclosed. In one embodiment, the method includes: disposing a first software communication agent on a first processor, the first processor having a first operating system, the first agent compatible with the first operating system (OS); disposing a second software communication agent on a second processor in data communication with the first processor, the second processor having a second operating system, the second agent compatible with the first operating system; and using the first operating system and the first agent to invoke a communications protocol to request data from the second processor via the second agent.

In one variant of the method, the first and second agents comprise RPC (remote procedure call)-enabled agents, and the communications protocol comprises an RPC-based protocol using UDP sockets associated with the first and second processors.

In another variant, the first OS comprises a platform-generic wrapper function layer, and the second processor comprises a platform-specific hardware abstraction layer, and the method includes using one or more wrapper functions in the platform-generic layer of the first processor to request specific data from one or more drivers below the platform-specific layer in the second processor.

In another aspect, a method of reducing operational change and testing time associated with an embedded device is disclosed. In one embodiment, the method includes: configuring a software stack of one processor of a multiprocessor architecture used in the embedded device with an open-source operating system, and configuring a second processor of the device that is not compatible with the open-source operating system with a communications agent to enable the first processor and the second processor to communicate data relating to one or more modularized services specified by the operating system of the first processor. The services enable testing and configuration of only specific ones of functions of the second processor, thereby obviating complete stack functional testing or reconfiguration.

In one embodiment, the method includes: configuring a software stack of one processor of a multiprocessor architecture used in the embedded device with an open-source operating system, and configuring a second processor of the device that is dedicated to another operating system with a communications agent to enable the first processor and the second processor to communicate data relating to one or more modularized services specified by the operating system of the first processor.

In another aspect, a method for communication between two processors is disclosed. In one embodiment, the processors comprise a host CPU and an application processor, and the method includes in one embodiment: creating a first communication agent in the first processor; creating a second communication agent in the second processor; enabling the communication between the first communication agent and the second communication agent; transferring the data between the first and second communication agent.

In another aspect, a cable modem is disclosed. In one embodiment, the cable modem includes: a first application processor apparatus; a first communication agent integrated in the first application processor; a second stack processor apparatus; a second communication agent integrated in the second processor; and a memory device in communication between the application and stack processor. In one variant, the first processor is configured to run at least one application program. The second processor is configured to run at least one stack OS. The first and the second processors configured to communicate to each other via the first and second communication agents.

In a further aspect, a gateway is disclosed. In one embodiment, the gateway includes: a first application processor apparatus; a first communication agent integrated in the first application processor; a second stack processor apparatus; a second communication agent integrated in the second processor; a memory device in communication between the application and stack processor, and a wireless router. In one variant, the first processor is configured to run at least one application program. The second processor is configured to run at least one stack OS. The first and the second processors configured to communicate to each other via the first and second communication agents. In another variant, the gateway includes voice functionality (including e.g., a VoIP stack).

In another aspect of the invention, a wireless access point is disclosed. In one embodiment, the wireless access point includes: a first communication agent integrated in a first application processor; a second processor apparatus with a second communication agent integrated within its operating system; a memory device in communication with the application and second processors, and a router.

In another aspect, an LTE (e.g. 4G/5G) UE with enhanced inter-processor communication and testing capabilities is disclosed.

In another aspect of disclosure, network apparatus for use within a first network is disclosed. In one embodiment, the network apparatus is configured to generate messaging to one or more attached devices, and includes: digital processor apparatus; network interface apparatus in data communication with the digital processor apparatus and configured to transact data with the one or more attached devices; and a storage apparatus in data communication with the digital processor apparatus and comprising at least one computer program.

In one variant, the messaging includes in one embodiment API calls to a deployed embedded device (e.g., CM or AP) to return certain types of data from an applications processor of the deployed device.

In one implementation, the API calls are made to the software stack of a host processor of the device, the host processor in inter-process communication with the application processor via an RPC-based communication link.

In another aspect, a computer readable apparatus is disclosed. In one embodiment, the apparatus includes a storage medium configured to store at least one computer program, the at least one computer program configured to execute on a digital processor apparatus and utilize a meta-layer of an operating system to enable both (i) communication between the digital processor apparatus and another digital processor apparatus within a common host device (e.g., cable modem or gateway), and (ii) communication of data obtained from the another processor apparatus with a networked software process.

BRIEF DESCRIPTION OF THE DRAWINGS

FIG. 4A illustrates one embodiment of an exemplary user interface displaying cmstatus results from an API call to the ARM processor by the Atom processor of FIG. 4.

FIG. 5B is a graphical representation illustrating one example of a prior art cable modem monolithic software stack, showing multi-point integration access.

FIG. 5C is a graphical representation illustrating one example of an OpenWrt-based cable modem software stack according to the disclosure, showing single-point integration access.

FIG. 6 is a graphical representation of one exemplary embodiment of cable modem (CM) configuration parameters obtained using an interface (e.g., Luci webUT) according to the present disclosure.

Figure 1:
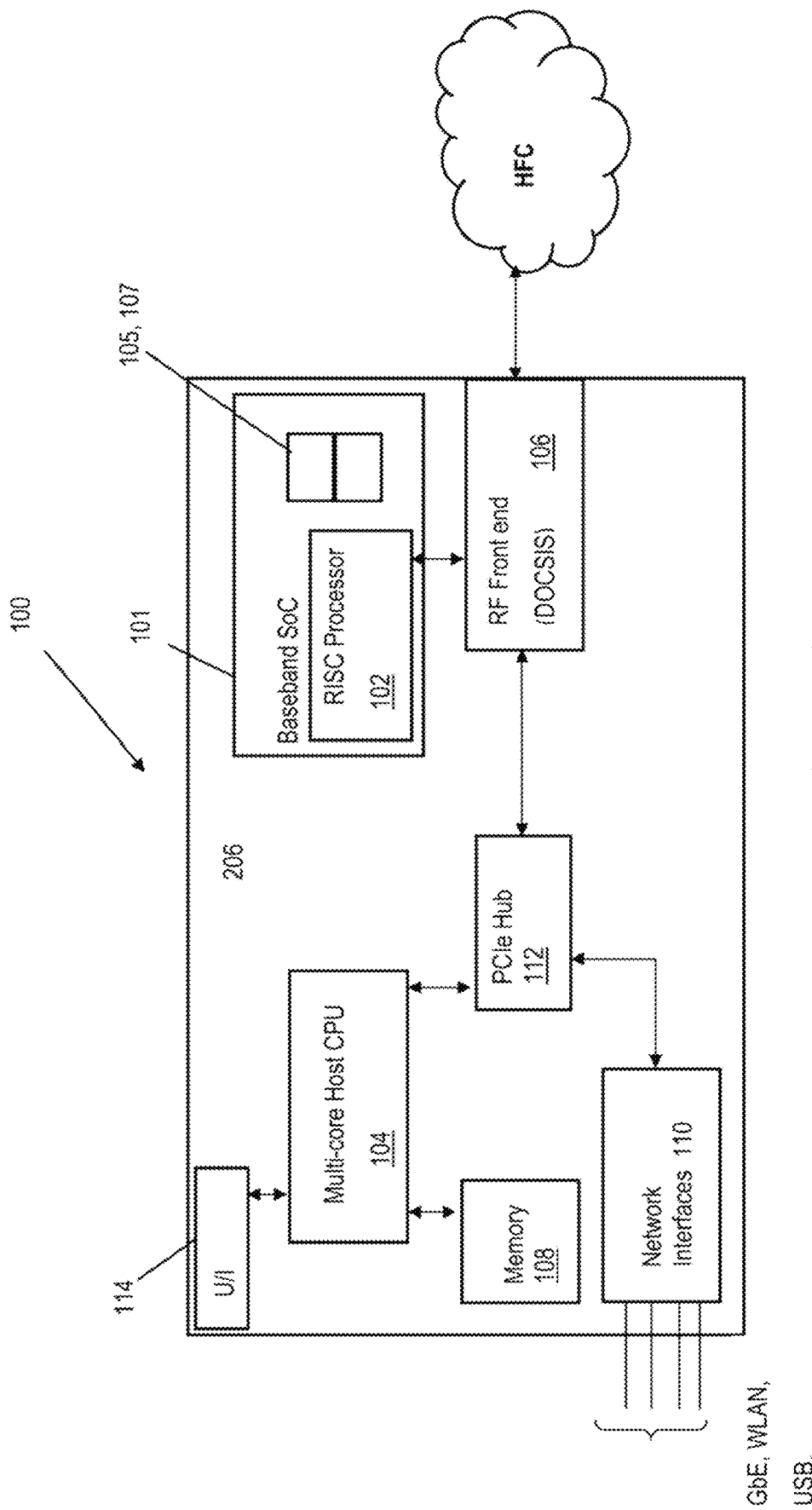
FIG. 1 is a functional block diagram illustrating one exemplary configuration of a prior art multi-processor electronic device (cable modem).

All figures © Copyright 2019 Charter Communications Operating, LLC. All rights reserved.

DETAILED DESCRIPTION OF THE INVENTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" or "user device" or "UE (user equipment)" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Ruby, Python, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR2/3/4/5/6 SDRAM, EDO/FPMS, RLDRAM, SRAM, "flash" memory (e.g., NAND/NOR), 3D memory, XPoint, spin-transfer/torque memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "QAM (quadrature amplitude modulation)" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" or UI refers to any human-system interface adapted to permit one- or multi-way interactivity between one or more users and the system. User interfaces include, without limitation, graphical UI, speech or audio UI, tactile UI, and even virtual UI (e.g., virtual or augmented reality).

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alfa, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides apparatus and methods for enhanced development, validation testing, and configuration/re-configuration of software of a multi-processor platform. In one embodiment described herein, an open-source OpenWrt architecture is utilized within the software stacks of the multiple processors (e.g., Host CPU and an application processor) of the platform to enable, inter alia, inter-process communication between the different environments in support of testing and configuration (including by entities other than the OEM/device manufacturer). In one variant, this functionality is accomplished by use of the Host CPU (e.g., an Intel Atom processor or the like running on a cable modem) to run an OpenWrt software stack and communicate with the application processor (e.g., a baseband SoC supporting DOCSIS modem functions via an embedded ARM core or core complex).

In one implementation, each processor includes an OpenWrt agent to enable communication between the multiple processors. These communications facilitate, for example, testing and firmware modifications by the deploying network operator, including on a per-function or "modular" basis (as opposed to a complete re-flash of the modem's firmware). These capabilities greatly reduce the time needed to test such devices and implement firmware changes over extant OEM-based approaches. They also permit modification on a per-class or even per-device basis (e.g., the aforementioned agents resident on a given device can be targeted for device-specific testing or configuration) by a remote cloud process.

In another embodiment, the platform which utilizes the OpenWrt and multi-processor inter-communication protocol described herein is a Wi-Fi AP/Router. 3GPP-compliant UE and xNB devices (e.g., smartphones and base stations/femtocells, respectively) are also disclosed.

Detailed Description of Exemplary Embodiments

Exemplary embodiments of the apparatus and methods of the present disclosure are now described in detail. While these exemplary embodiments are described in the context of the aforementioned hybrid fiber coax (HFC) cable system architecture having an multimedia specific operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present disclosure may be readily adapted to other types of environments (e.g., commercial/enterprise, government/military, etc.) as well. Myriad other applications are possible.

Figure 2:
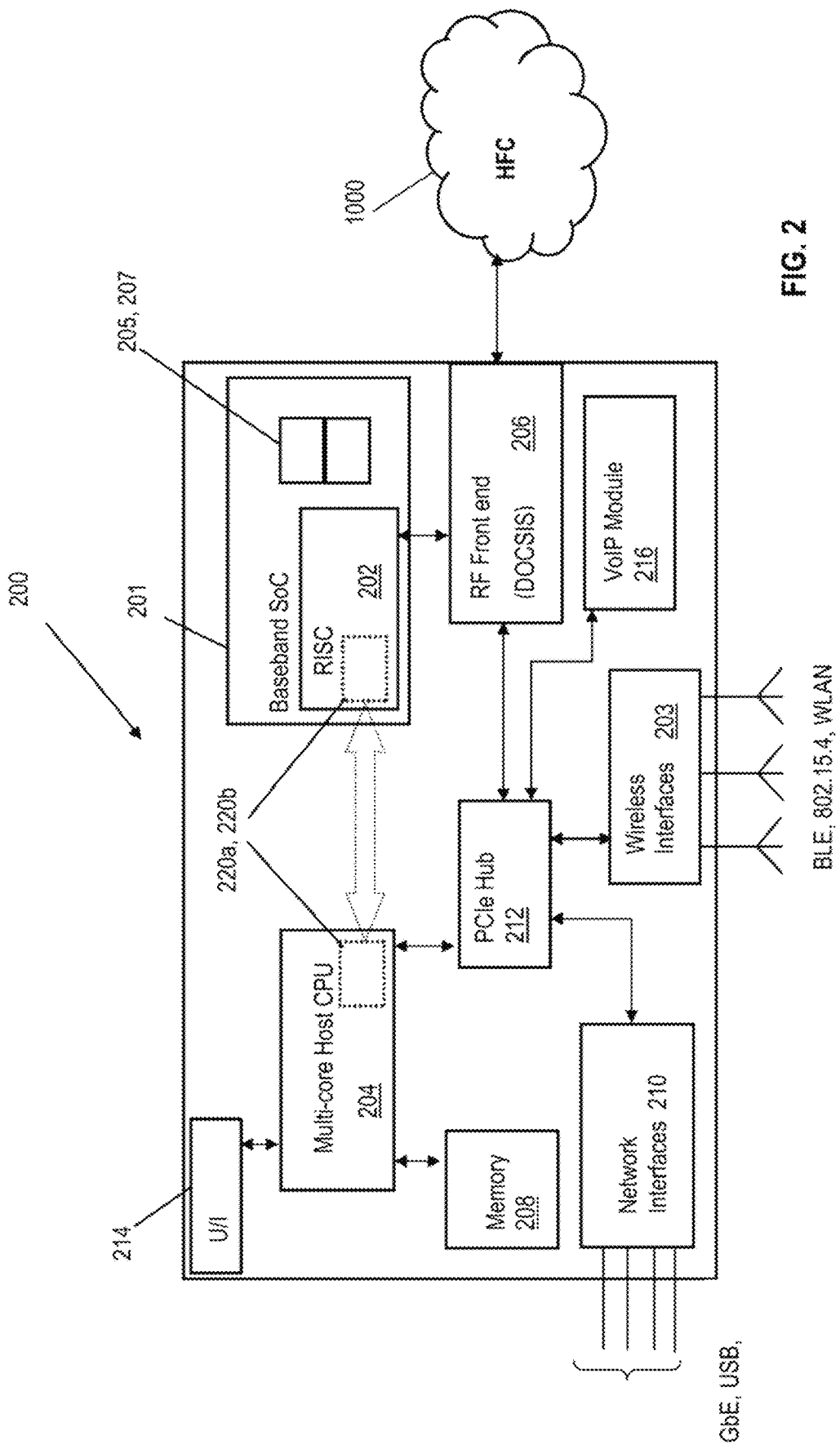
FIG. 2 is a functional block diagram illustrating an exemplary embodiment of a multi-processor cable modem according to the present disclosure (voice gateway can be added to the figure).

Referring now to FIG. 2, a first embodiment of an enhanced multi-processor architecture device 200 according to the present disclosure is described. As shown in FIG. 2, the exemplary residential and SMB (Small-Medium Business) gateway device 200 with cable modem includes an RF baseband SoC 201 with RISC processor 202 (e.g., an ARM-based solution such as an ARM7 or ARM8 core) as part of a baseband SoC including the PHY and MAC stacks 205, 207 for a DOCSIS CM RF front end interface 206, a host processor (e.g., multi-core CPU such as an Intel Atom) 204, a plurality of back-end network interfaces 210, memory (e.g., DDR DRAM with memory controller) 208, SRAM (not shown), bus controller/hub 212 (such as PCIe-based), plurality of wireless air interfaces (e.g., BLE, WLAN, IEEE Std. 802.15.4, etc.) and supporting hardware/stacks 203, and user interface(s) 214. A VoIP module/stack (or other voice functionality for the gateway) 216 may also be utilized as shown, such as one utilizing RTCP/RTP and/or SIP protocols of the type known in the art executing on the module 216 or the host CPU 204. It will be appreciated that the illustrated architecture is merely exemplary of a number of devices which utilize two (or more) e.g., heterogeneous processor types.

As shown, the two processor SoCs 204, 201 each include a software agent 220a, 220b respectively to enable new functions including, inter alfa: (i) inter-processor/inter-process communication, (ii) remote access of the stack(s) including that of the baseband SoC modem 201, such as for testing or configuration changes; and (iii) output of information from e.g., the Host CPU 204. These functions are described subsequently herein in greater detail with respect to FIGS. 2A-6.

Figure 2A:
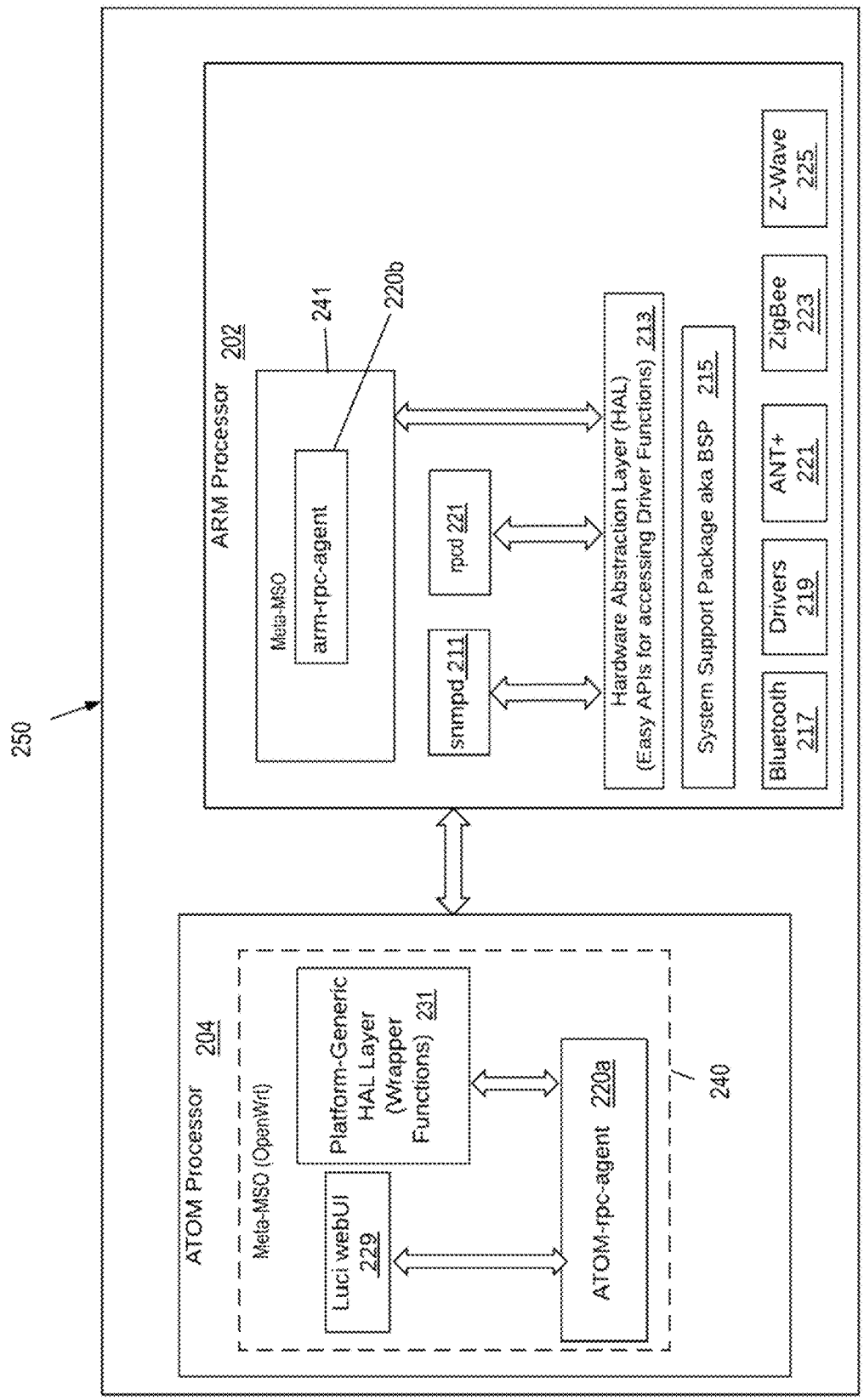
FIG. 2A is a block diagram illustrating one embodiment of a software architecture used within the cable modem 200 of FIG. 2.

FIG. 2A illustrates an exemplary implementation of the exemplary gateway 200 of FIG. 2, specifically in terms of its software architecture. In this implementation, the two different processors 202, 204 comprise an ARM core within a baseband SoC 201 and an Atom SoC device. The CM stack is executed on the ARM processor, and host device OS functions and application software is executed on the Atom processor. In this implementation, the software architecture on the ARM processor 202 includes hardware drivers and supporting protocols for various hardware components such as a CM tuner, LEDs, and IoT devices such as ZigBee and Z-Wave air interfaces. A Hardware Abstraction Layer (HAL) 213 is also utilized, which includes APIs that enable access the hardware components. One role of the HAL 213 is to decouple the hardware components from the software components 211, 221, 205 above the HAL. In this implementation, the OEM vendor proprietary software on the Atom processor 204 is replaced (e.g., at time of firmware build) with OpenWrt-based software components which are part of the described architecture.

As a brief aside, OpenWrt in an open source Linux-based firmware development system built by a community of users, which can allow creation of new functionality by providing firmware and an open source build system that permit customization and personalization of the software on a given device. OpenWrt is one example of a broader class of environments providing similar functionality which may be used consistent with the present disclosure. For instance, in one variant, the Yocto-based RDK-B (Reference Design Kit for Broadband) environment can be used consistent with Linux OS systems. It will further be appreciated, however, that the various aspects of the present disclosure are in no way limited to the exemplary Linux OS embodiments described herein, in fact, the methods and apparatus described herein may be readily adapted to non-Linux OS implementations by those of ordinary skill when given the present disclosure.

OpenWrt features a writeable root file system, which has the advantages of, inter alfa: (i) enabling users to modify any file, and (ii) enabling easy installation of additional software. This is to be contrasted with other types of firmware based on read-only file systems which require a rebuild and re-flash of the firmware image into the target device.

Of further note is the developer base associated with the exemplary OpenWrt environment described herein. Specifically, by selection of an environment which is broadly supported by developers, the development base for e.g., applications which may be utilized with the apparatus 200 of other target device is expanded. Stated simply, more people will be developing applications which may be utilized within the environment, and hence the range of possible functionality that may ultimately be included within the feature set of the final firmware "build" is arguably greater.

Additionally, through selection of an "open" environment such as OpenWrt, the various functionalities described in the present disclosure are accessible to a broader audience, in contrast to: (i) the vendor proprietary firmware environment which requires a specific developer's license (and associated cost and management complexities), and (ii) the "pseudo-closed" environment of e.g., RDK-B, for which access is limited to only members of the organization. In contrast, literally any user can access and utilize the OpenWrt SDK and environment as described here, thereby advantageously adding ubiquity.

Referring again to FIG. 2A, a meta-MSO layer 240 with Open-Embedded metadata for the OpenWrt package was created and integrated with an Intel SDK-Atom stack (see FIG. 3), which includes the wrapper functions 231 for OpenWrt platform communications. It is noted that in the present embodiment (i.e., Atom and ARM cores), replacement of the vendor proprietary firmware with OpenWrt OS required use of the Atom processor 204 to run the OS, because the particular ARM core architecture of the particular implementation (for the CM stack) does not sufficiently support OpenWrt (i.e., due to comparatively limited processing power relative to the Atom Host CPU 204. It will be appreciated, however, that in alternate configurations (including those where the application/baseband processor 202 supports the chosen OS environment), the stack of the application processor may be modified similar to that of the Atom stack in the present embodiment.

Moreover, it will be appreciated that while a "pull" type architecture is shown in the exemplary embodiments described herein (i.e., the Host CPU with OpenWrt stack 204 issues an RPC request, and the ARM core 202 responds), other types of communication architectures/protocols may be used consistent with the disclosure. For instance, where the ARM or other baseband processor 202 is sufficient to support the OpenWrt stack, the modified stack (similar to that running on the Host CPU 204 in the embodiments above) can be run on the ARM/baseband SoC core 202, and data "pushed" therefrom to e.g., an agent operative to run on the Host CPU 204 which receives the (e.g., RPC-based) communications. Stated differently, the logical "anchor" for the stack may be moved from the Host CPU to the ARM core in such cases, with the Host CPU retaining network (external) connectivity to e.g., a remote network-based management process. In one such scenario, the ARM/baseband stack merely pushes out periodic data transmissions to the Host CPU via the UDP port of the latter. In another such scenario, the "pushes" of data are triggered by one or more events within the ARM/baseband SoC.

In the embodiment of FIG. 2A, RPC agents 220a, 220b on both the ARM processor and Atom processor respectively are used, in order to facilitate a "single communications point" approach to and from the Atom processor 204. The Atom RPC agent 220a and associated Platform-generic HAL layer 231 cooperate to enable inter-process communication between the processors, and support device functions below the HAL 231. A Luci webUI component 229 is also provided to display the CM-specific information for e.g., a remote user interface (see discussion of FIG. 10A infra).

Figure 3:
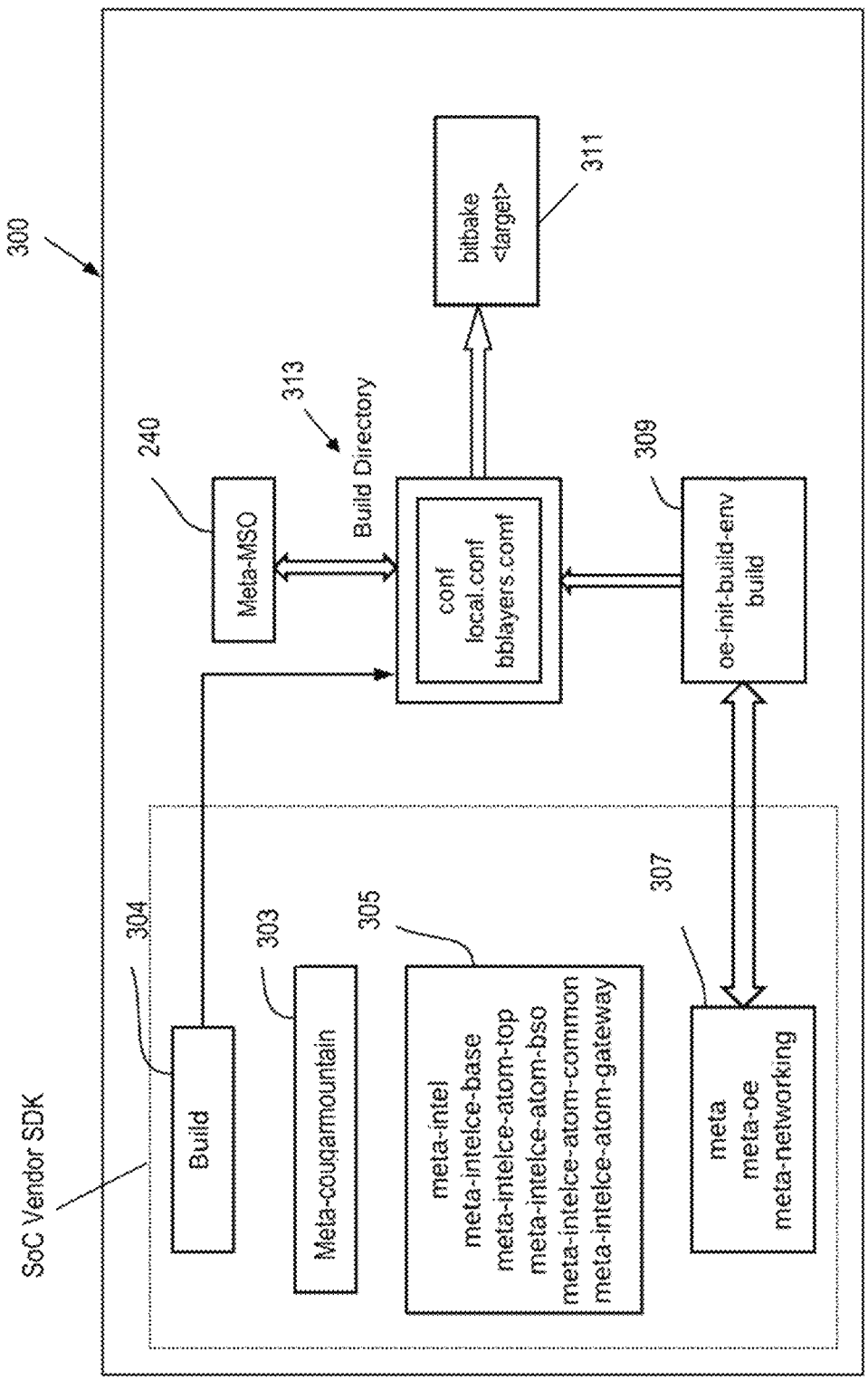
FIG. 3 is a block diagram illustrating one exemplar embodiment of a software stack of an exemplary Host CPU (e.g., Atom processor) with OpenWrt components integrated therein, according to the present disclosure.

Referring to FIG. 3, one implementation of the integration between the various components of the modified Host CPU (e.g., Atom) processor stack of the device 200 of FIG. 2 are shown. As shown, these modifications include the integration of the meta-OpenWrt layer 240 along with Atom-rpc-agent 220a and platform-generic HAL layer 231 with an extant Intel SDK-based Atom stack. In the illustrated implementation, the SoC vendor (e.g., Intel for exemplary Atom processor) provides the SDK, which includes the various components 304, 303, 305, and 307 shown. The SDK provides receipt files with an SoC vendor URL which acts as a repository. As described above, the exemplary configuration of the meta-MSO component 240 includes an RPC agent 220a, webUI 229, and uses a receipt to fetch OpenWrt code. The Build Directory 313 shown in FIG. 3 is in one implementation a Yocto framework, and is used to integrate the SoC vendor SDK with meta-MSO software on the Atom processor. A build tool 311 is used to generate the desired firmware image for the gateway apparatus 200 with the target file name, based on the OpenWrt and SoC vendor SDK.

As a brief aside, the exemplary Yocto framework Build Directory is an open source build environment, which consists of different default meta-layers (i.e. meta-openembedded) to organize and build different SoC vendor SDKs, although it will be appreciated that other frameworks or environments may be used consistent with the disclosure. The Yocto framework aids developers in creation of custom Linux-based systems regardless of the underlying hardware architecture (i.e., is agnostic to the hardware implementation).

Accordingly, the exemplary Yocto framework was customized by the inventors hereof by first creating three (3) meta-layers, specifically: (i) meta-MSO (on Atom stack) which includes "recipes" (e.g., instructions how to build each component in OpenWrt such as the atom-rpc-agent, WebUI, and any supporting software components); for example, the recipe for the atom-rpc-agent includes a pointer to an atom-rpc-agent source code repository, and instructions how to build this component that can be used by the build tool 311 (bitbake), and (ii) meta-MSO-OEM (on ARM stack), which includes recipes for the cable modem Tuner, the LED patch, and the arm-rpc-agent, and (iii) meta-virtualization (on Atom stack) consists of recipes how to build the desired application such as iPerf speed test in a container (specified in *.conf file in Build Directory 313).

Next, the SoC vendor SDK and Yocto build environment was integrated with these two meta-layers, with the Yocto build tool 311 (bitbake) used to generate the customized OpenWrt firmware image.

In this implementation, the wrapper functions are Atom-RPC agent APIs (Application Programming Interfaces) that when invoked request specific information from the ARM HAL 213 to access drivers below the HAL 213. These APIs also leverage the SNMP and RPC (remote procedure call) daemons above the HAL 213 on the ARM processor 202. Some examples of cable modem wrapper functions provided by the APIs are described in Table 1.

TABLE 1

Exemplary Cable Modem Wrapper Functions

| | | |
|---|---|---|
| Get DOCSIS Log | Get Reset Count | Get CM IP address |
| GET CM Certs | Get Reset Type | Get DHCPv4 |
| Get CM Cert Status | Get Last Reset Reason | Get DOCSIS Info |
| Get IPv6 DHCP Infor | Get CPE List | Get Telephony DHCP Status |

It is noted that advantageously, one of the functions addressed by the exemplary software architecture described herein is the establishment of communications between the Host CPU and applications processors (e.g., ARM and Atom) in order to access and transfer the CM information residing on the ARM processor to the Atom processor. As part of that functionality, since the RPC mechanism component 'gwControl' was developed only for the RDK-B framework (and not for OpenWrt), adaptation was necessary. Specifically, in one embodiment, this adaptation comprises: (i) use of the above RPC mechanism to provide the CM information from the ARM core 202 to the Atom processor 204; (ii) creation of both the Atom-RPC agent 220a and ARM-RPC agent 220b on the respective Atom and ARM software stacks (see FIGS. 2-2A) to enable the communications between the processors using UDP sockets (see FIG. 4 and discussion thereof); (iii) use of the APIs (wrapper functions) in the Atom Platform-generic HAL layer 231 to request specific data from the drivers below the HAL 213 in the ARM processor stack; and (iv) utilization of containers 517 for services (such as iPerf speed test 519 and MAP-T 521; see FIG. 5A) to maintain abstraction between the services-software and the OS/hardware chipsets 201, 204.

Figure 4:
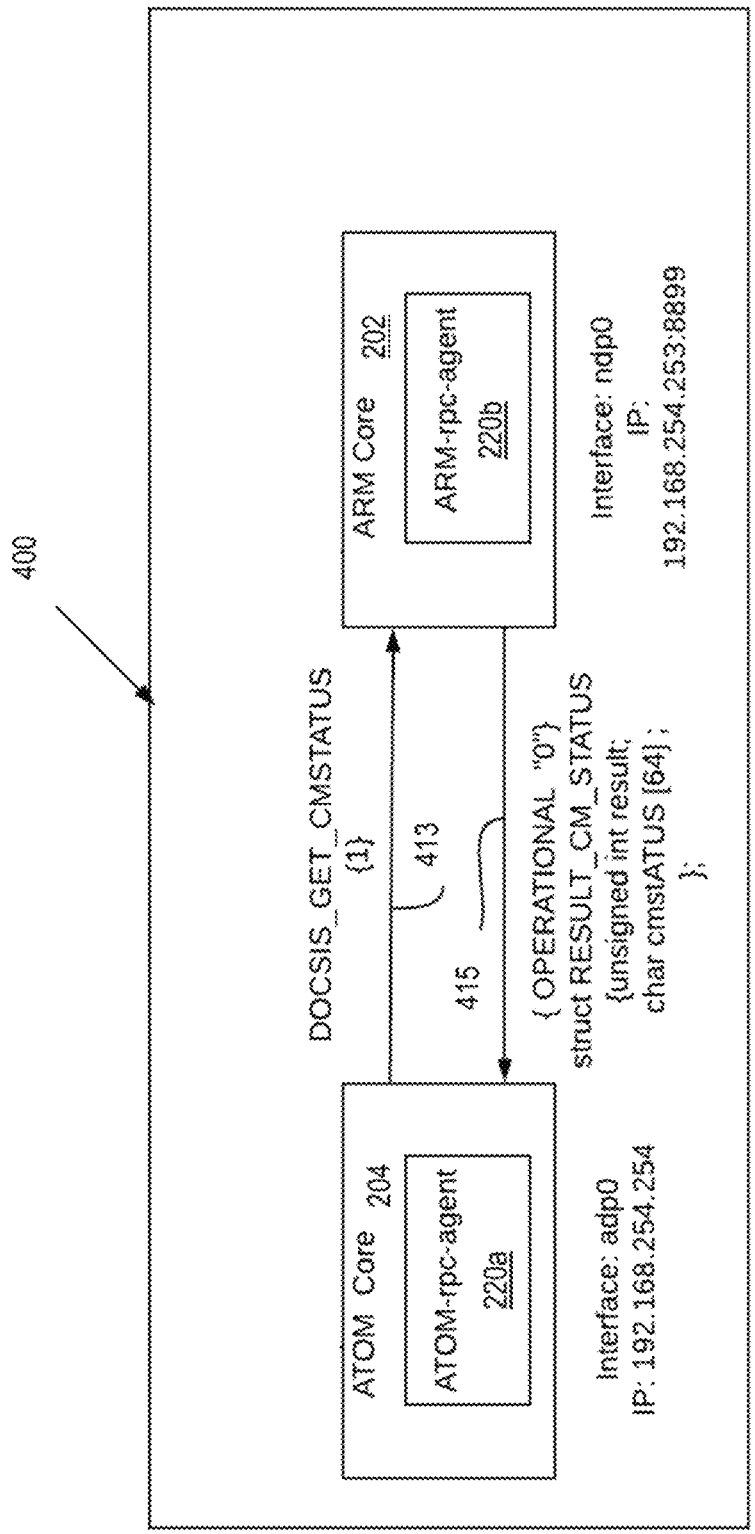
FIG. 4 is a graphical illustration of an exemplary mechanism for communication between processors a according to the present disclosure.

FIG. 4 illustrates a block diagram of an exemplary RPC mechanism for Atom processor to ARM processor communication according to the present disclosure. As previously described, use of both the Atom-RPC agent 220a and ARM-RPC agent 220b on the respective Atom and ARM software stacks (see FIGS. 2-2A) enables communications between the processors using UDP sockets. For instance, as shown, the Atom core 204 and ARM core each are assigned different IP addresses for communication with one another (in effect acting like two network sources/destinations). As shown, the Atom core 204 issues an API call to the ARM core (e.g., DOCSIS_GET_CMSTATUS) 413 via the bidirectional protocol-layer link between the two, and the ARM core 202 responds with a result 415 in a prescribed format; see the exemplary results status shown in FIG. 4A.

Figure 5A:
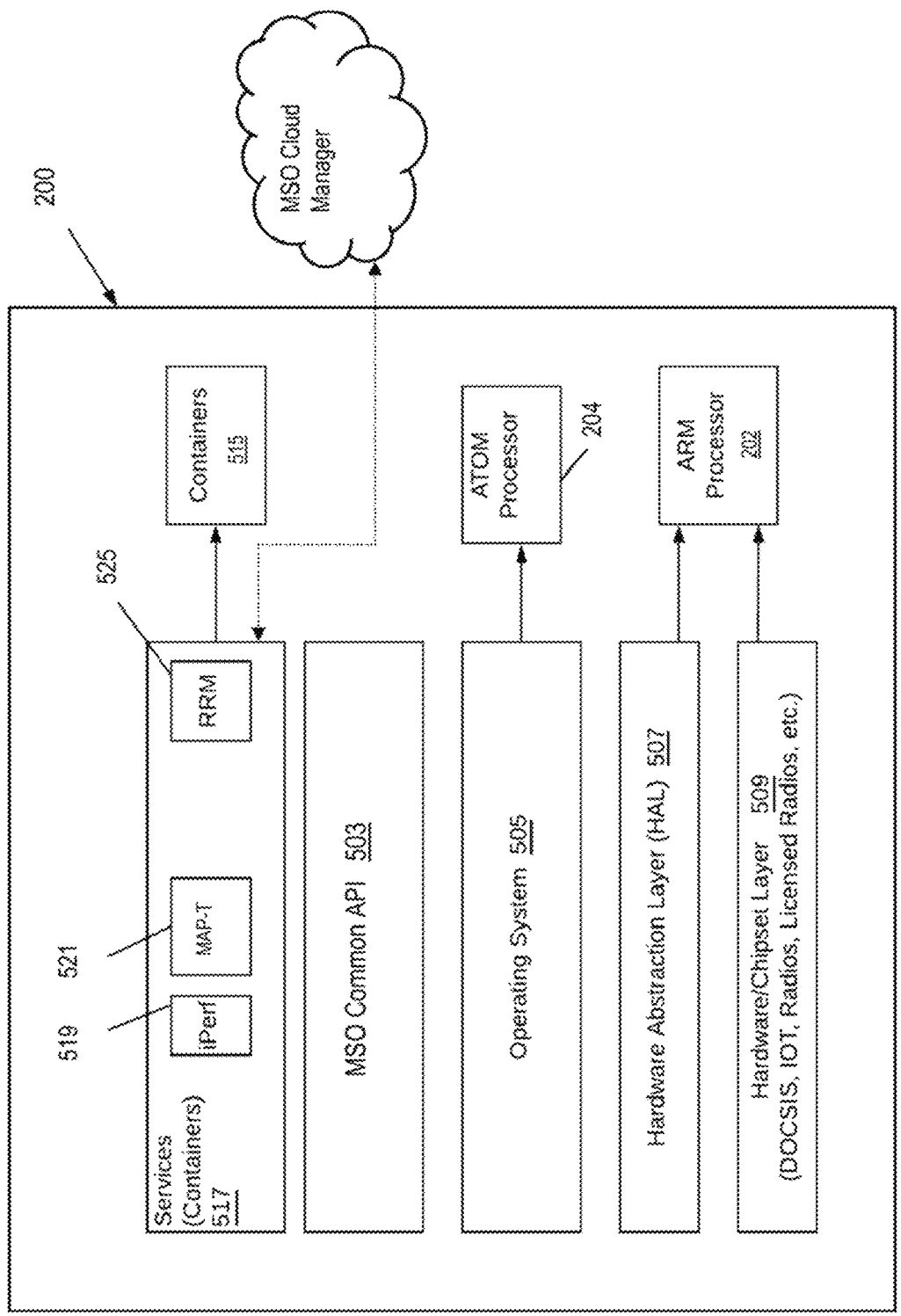
FIG. 5A is a graphical representation illustrating one example of OpenWrt-based cable modem hardware and software architecture according to the present disclosure.

Referring to FIG. 5A, the software architecture of the CM 200 relative to the Atom and ARM processors is shown. A services container 517 include various independently managed applications or services such as iPerf speed test 519, MAP-T 521, and RRM 525. The software containers iPerf, MAP-T, Routing, and RRM used with OpenWrt, advantageously modularize the device 200 software build release, by isolating each network function, which reduces operational changes and testing time. Containers and their contents are created by the cognizant entity (e.g., MSO) either within the MSO cloud (shown) or a public cloud service.

As referenced above, the exemplary embodiments of the present disclosure make extensive use of containerization with respect to the target build for the e.g., gateway apparatus 200. Advantageously, OpenWrt includes a "build-time" function which enables creation of a complete software load used at run-time—similar to how firmware is ultimately utilized under extant (prior art) models. Container usage with OpenWrt modularizes the software build release by isolating each (e.g., network) function, which reduces the operational changes and testing time, including at run-time. There are also several attendant advantages to use of such containerized architecture, including: (i) development/testing/debug is comparatively easier than a non-containerized system; (ii) homogenous environment (i.e., the container environment doesn't change from lab to production); (iii) "orchestration" of multiple containers (discussed below) is relatively simple and well-developed; and (iv) the container environment adds low-latency in the execution of the application in the container. As discussed above, traditional firmware models are in contrast much more complicated (especially debug/testing), and update and management of a particular feature in the firmware environment may impact the operation of other features (aka "ripple effect").

As shown in FIGS. 5B and 5C herein, the exemplary embodiments of the present disclosure advantageously permit a unified or single access point 545 for each of the integrated features via (i) the common API (in this case which is MSO-defined, thereby adding additional flexibility over the prior art approach 530 of FIG. 5B having multiple integration points 540), and (ii) use of a container engine (e.g., "Docker"). As a general relationship, a metric of "integration complexity" can be defined as in Eqn. (1) below:

$$\text{Integration Complexity} = \text{No. integration points} \times \text{No. hardware/chipset vendors Eqn.} \qquad (1)$$

Hence, with a single point of integration as in the architecture 532 of FIG. 5C, the complexity required to implement and manage the implemented solution is significantly reduced.

In one variant, after the containers are created, they are managed (e.g. managed with revision control software of the MSO or designated proxy), implemented on a CPE device, and monitored for proper operation. This management, implementation and monitoring is performed in whole or in part by a cluster manager environment (such as for example Nomad), or a container orchestrator (such as Kubernetes). Nomad is a workload orchestrator that enables an organization to deploy and manage any containerized or legacy application using a single, unified workflow. Nomad can run a diverse workload of Docker, non-containerized, microservice, and batch applications. Nomad enables developers to use declarative infrastructure-as-code for deploying applications. Nomad also uses bin packing to efficiently schedule jobs and optimize for resource utilization.

In one particular implementation of the methods and apparatus described herein, an unprivileged runtime containerization (using the aforementioned Nomad orchestration for container management) is utilized. As a brief aside, privileged containers are created by root, and run with true root privileges. If a root UID breaks out of its container, it could affect other container processes or even the entire host system.

In contrast, unprivileged containers allow UID root permissions only within that container. If a root UID breaks out of its container, it has no system rights. As such, the unprivileged approach is more secure, in that no rights are extended outside the UID's own container.

Another aspect of the exemplary embodiment discussed above is "runtime" versus "build-time" containerization. With runtime containerization, a template file is created during device boot-up, and container creation occurs during boot-up (as does container startup). Less implementation overhead and easier debug are associated with runtime containerization, as is more agile feature implementation or removal. In contrast, in build-time containerization, the template file is created during build time, as does container creation. Container startup occurs via the build-time configuration. Build-time containerization is generally secure and resilient to penetration because container configurations and startup sequences are stored in read-only areas. Moreover, build-time containerization is typically scalable, and can inherit the LXC class to generate containers for any process or group of processes.

In the exemplary embodiments described herein, runtime containerization is selected for its reduced overhead and flexibility, although it is contemplated herein that other applications may select build-time containerization depending on the particular desired attributes. Advantageously, the methods and apparatus described herein are compatible with either (given proper adaptation by one of ordinary skill given this disclosure).

Table 2 below shows exemplary software features or applications that can either be fully or partially containerized and placed above the OpenWrt layer, according to various embodiments of the present disclosure (as applied to the exemplary CM apparatus 200 of FIG. 2).

TABLE 2

Exemplary CPE Software Features that can be Fully or Partially Containerized

| Software Feature | Fully Containerized | Partially Containerized | Un-Containerized |
|---|---|---|---|
| iPerf Speed Test | | Yes | |
| MAP-T | | | Yes |
| TR-069 | Yes | | |
| MSO Community Wi-Fi | | Yes | |
| CUJO | | Yes | |
| RRM/SON | Yes | | |
| IoT | Yes | | |

The iPerf speed test 519 of Table 2 and FIG. 5A is run to measure the downstream and upstream throughput on the WAN interface (e.g., DOCSIS CM) of the device.

The exemplary MAP-T container 515 provide IPv4 to IPv6 address translation.

The exemplary CUJO function provides an identification for connected devices in the premises network.

The Radio Resource manager (RRM) 525 feature is used in conjunction with a wireless-enabled gateway device, such as the apparatus 200 of FIG. 2.

The IoT container manages IoT devices in the premises network, which may include for example the IoT hardware interfaces of the gateway, or even devices in wireless communication therewith.

Figure 10:
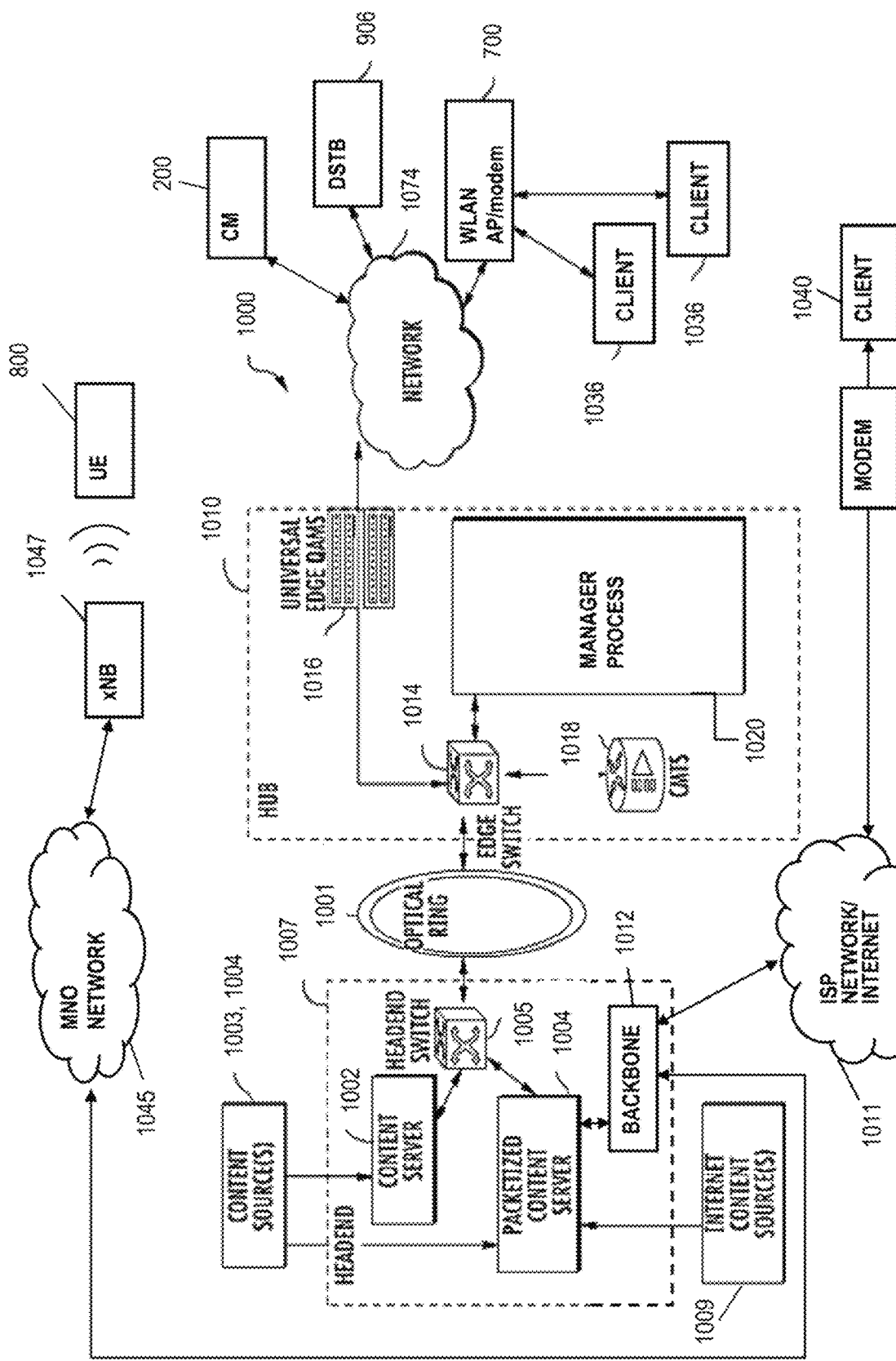
FIG. 10 is a functional block diagram illustrating an exemplary packetized network architecture useful with the present disclosure, including enhanced CM, DSTB, xNB, and/or UE devices.
Figure 10A:
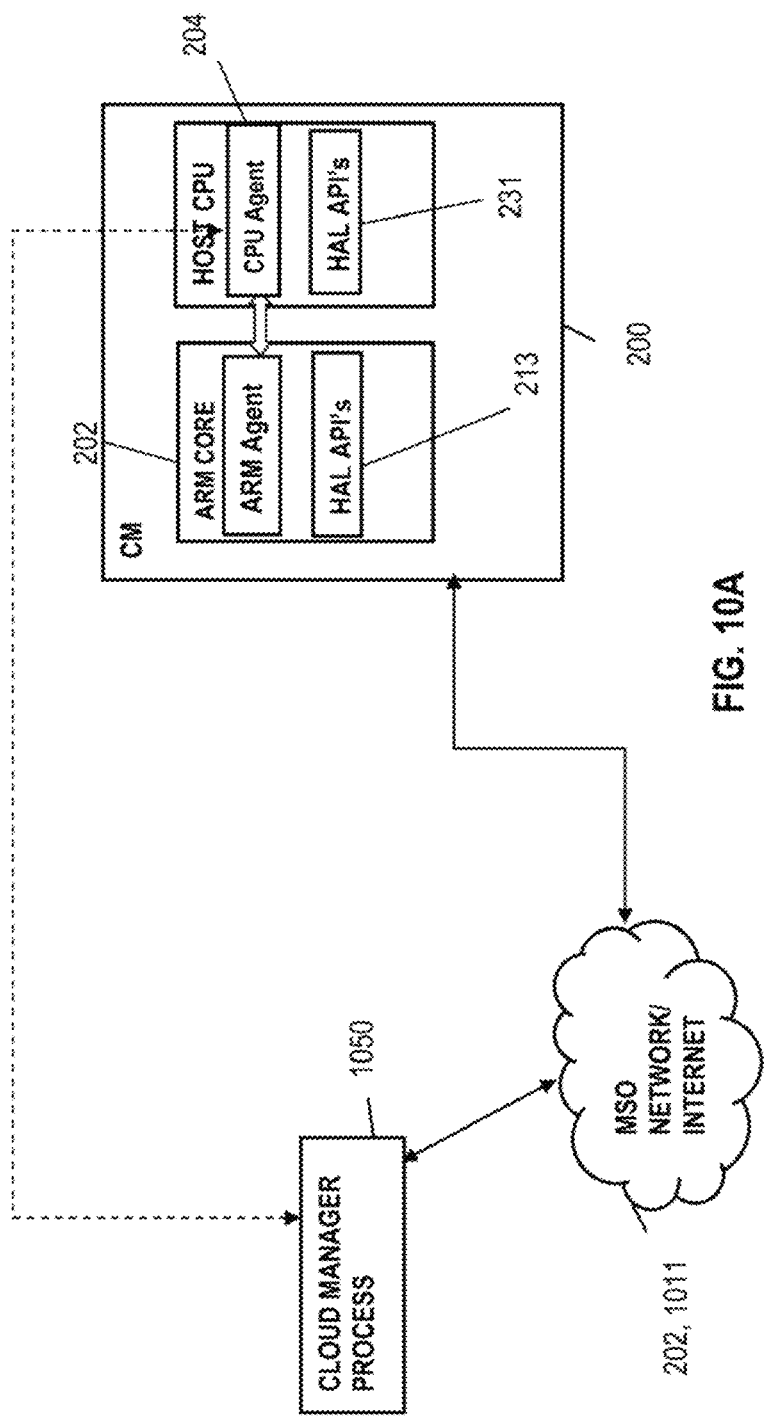
FIG. 10A is a functional block diagram illustrating of one embodiment of a remote API access architecture for use with the OpenWrt agents of the target device.

FIG. 6 illustrates an exemplary implementation of the Luci webUI software user interface feature 229 (see FIG. 2A), which provides the means to output various CM networking and operational parameters to a local or remote UI (e.g., a cloud-based network manager process operated by the MSO or a third party proxy; see FIG. 10A). Various independently managed applications or services can be placed above the OpenWrt software layer.

Wireless Access Point (AP) and Router Client Device Apparatus

Figure 7:
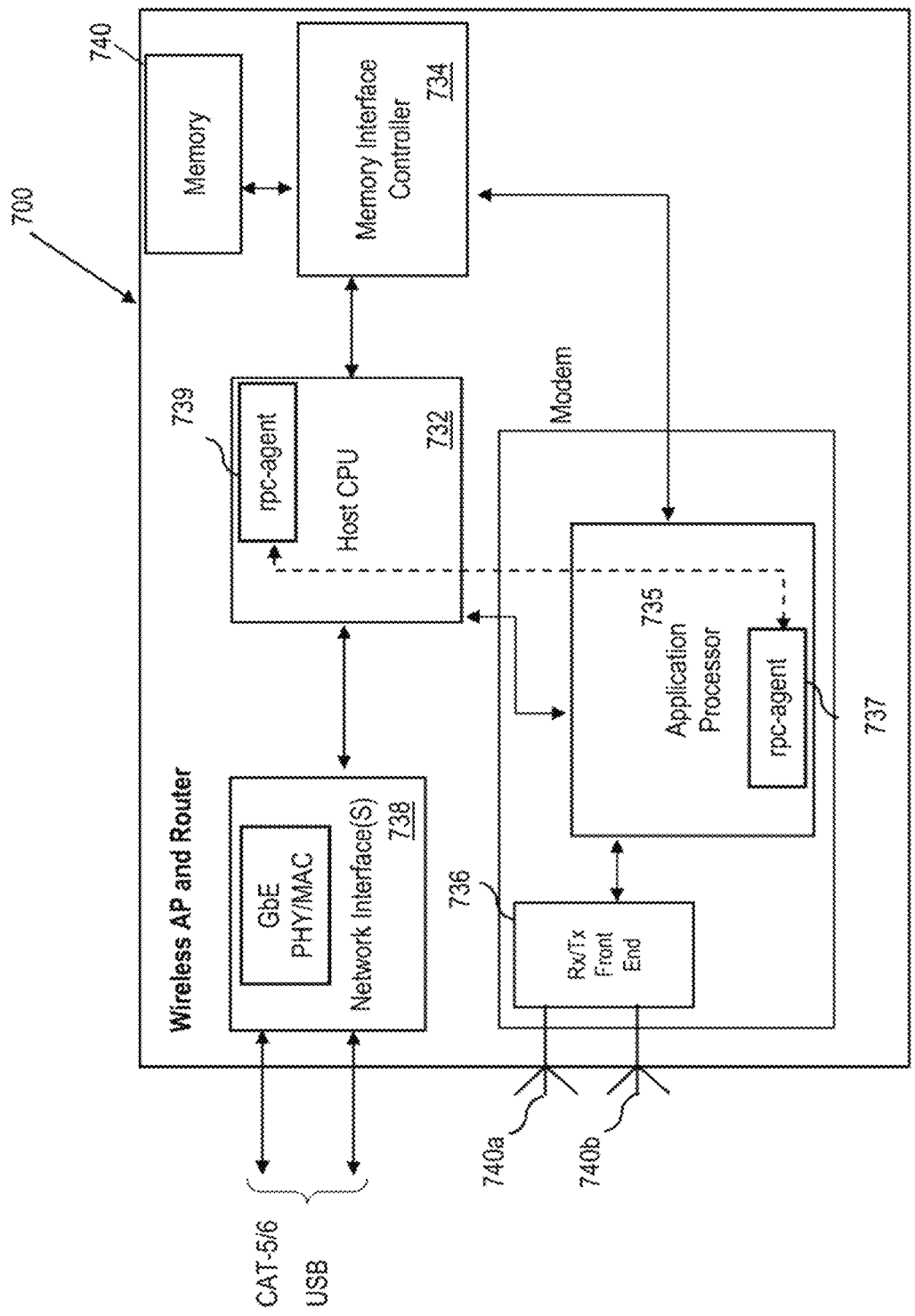
FIG. 7 is a functional block diagram illustrating one exemplary embodiment of a multi-processor wireless access point (AP) according to the present disclosure.

FIG. 7 is a functional block diagram of an embodiment of a multi-processor AP and router apparatus according to the present disclosure. As shown in FIG. 7, the client device 700 includes, inter alia, an application or baseband (e.g., ARM core-based) processor 735, Host CPU (e.g., Atom) Processor SoC 732, a memory module 734, one or more radio frequency (RF) front ends 736, and a plurality of network interfaces 738 such as e.g., GbE SoC with MAC and PHY.

The application processor subsystem 735 may also comprise an internal cache memory (e.g., L1/L2/L3 cache). The processor subsystem is in this embodiment in communication with the shared memory subsystem interface controller 734 (e.g., according to shared memory architecture with the Host CPU), including memory 740 which may for example comprise SRAM, flash, and/or SDRAM components. The memory subsystem may implement one or more of DMA-type hardware, so as to facilitate data accesses as is well known in the art. The memory subsystem of the exemplary embodiment also contains computer-executable instructions which are executable by the processor subsystem, although these may reside on local memory (not shown) of the applications processor subsystem SoC 735. The Host processor subsystem 732 may similarly comprise an internal cache memory (e.g., L1/L2/L3 cache), and is in communication with the shared memory subsystem 734, although independent memory architectures may be used as well.

In the illustrated embodiment, the Host CPU (e.g., Atom) processor 732 is configured to execute OpenWrt OS. The rpc-agent 739 associated to the HAL layer is the single communications point to and from Atom processor to the application (e.g., ARM) processor.

In one embodiment, the exemplary ARM processor includes hardware drivers for various hardware components such as the AP RF transceiver, LEDs, and protocols for ancillary devices (such as e.g., Bluetooth, ZigBee and Z-Wave air interfaces; not shown), and also the Hardware Abstraction Layer (HAL) that includes the APIs that access the various hardware components. The rpc-agent 737 supports the single communications point to and from the ARM accessible by the Host CPU agent 739 (an ultimately the cloud manager of FIG. 10A).

Various other functions in support of the WLAN AP and router are also performed by the device, including baseband management (e.g., transmit and receive functions via the baseband processor 735 and associated Tx and Rx chains of the RF front end 736 and their MIMO or spatially diverse antenna elements 740a, 740b). In the illustrated embodiment, the AP and router device 700 operates as a typical Wi-Fi modem and router, whether in the 2.4 GHz or 5.0 GHz bands, to provide WLAN connectivity throughout the premises and connectivity to networking functions.

It will be appreciated that while shown as a stand-alone device, the AP and router apparatus 700 of FIG. 7 can be integrated with another premises device, such as a CM or other device. As such, each of the "devices" within the aggregated form factor may make use of the various methods and apparatus described herein. For example, in one such configuration, the aggregated device uses a common or single Host CPU, with a number of different heterogeneous applications processors communicative therewith for functions such as WLAN or PAN baseband stacks, CM stacks, Gigabit Ethernet MAC.PHY, security processors (SPs), or yet other functions.

3GPP UE Apparatus

Figure 8:
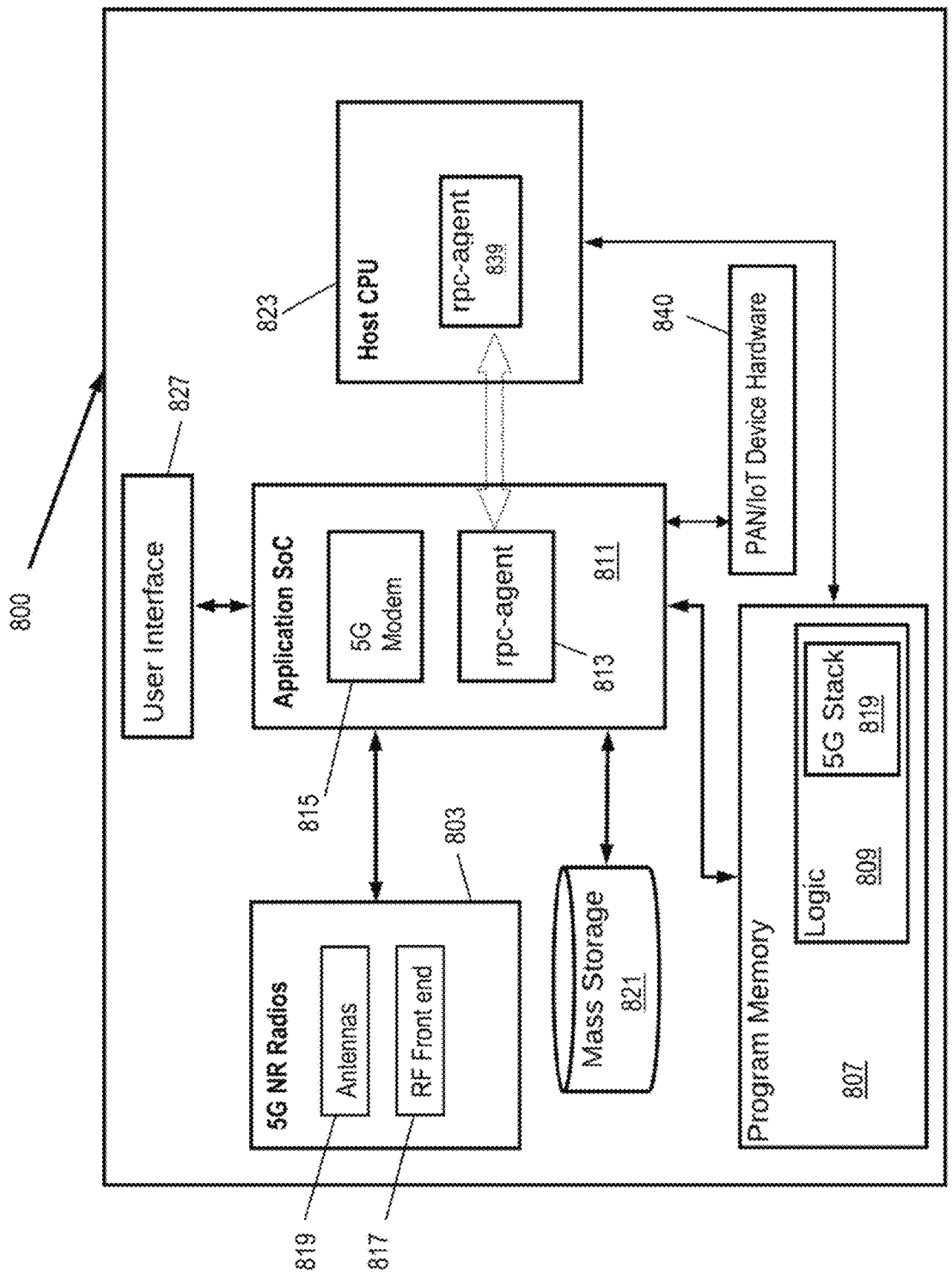
FIG. 8 is a functional block diagram illustrating one exemplary embodiment of a multi-processor 3GPP-compliant (e.g., LTE or 5G NR) UE according to the present disclosure.

FIG. 8 illustrates a block diagram of an exemplary embodiment of a 3GPP-compliant (e.g., 4G/4.5G/5G) UE (user equipment) 800 apparatus, configured in accordance with the present disclosure.

In the embodiment shown, the UE 800 includes, inter alia, one or more applications processors or subsystems 811, a host CPU SoC 823, a program memory module 807, UE logic 809 (here implemented as software or firmware operative to execute on the processor 823), and one or more wireless interface 803 for communications with the relevant RANs (e.g., 5G-NR RAN). The RF interfaces 803 are each configured to comply with the relevant PHY standards which it supports and the 5G modem of the SoC. The antenna(s) 819 of the UE radios may include multiple spatially diverse individual elements in e.g., a MIMO- or MISO-type configuration, such that spatial diversity of the received signals can be utilized.

In one embodiment, the application processor SoC 811 may include plurality of processing components mounted on one or more substrates, and may also comprise an internal cache memory, and a modem 815. In addition, the processor SoC 811 may include an rpc-agent software module 813. As in prior embodiments, the rpc-agent 813 is used as the point communication from and to the application SoC core processor. The various SoCs 811, 823 may be in communication with a program memory module or subsystem 807, where the latter may include memory which may comprise, e.g., SRAM, flash and/or SDRAM components. The memory module 807 may implement one or more of direct memory access (DMA) type hardware, so as to facilitate data accesses as is well known in the art. The memory module of the exemplary embodiment contains one or more computer-executable instructions that are executable by the processors 811, 823. Other embodiments may implement at least some of the functionality within dedicated hardware, logic, and/or specialized co-processors (not shown).

A mass storage device (e.g., SSD, and/or NAND/NOR flash or the like) is also provided as shown.

In one embodiment, the ARM processor includes hardware drivers for various hardware components such as AP transceiver, LEDs, and protocols for PAN or IoT devices 840 such as BLE, ZigBee and Z-Wave, and also the Hardware Abstraction Layer (HAL) that includes the APIs that access the hardware components. The rpc-agent 837 supports the single communications point to and from the ARM.

The Atom processor subsystem 823 may also comprise an internal cache memory (e.g., L1/L2/L3 cache). The processor subsystem is in communication with a memory subsystem 834, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In one embodiment, the Atom processor 832 is configured to execute the OpenWrt application software/firmware. The rpc-agent 839 associated to HAL layer is the single communications point to and from Atom processor to ARM processor.

Service Provider Network

Figure 9:
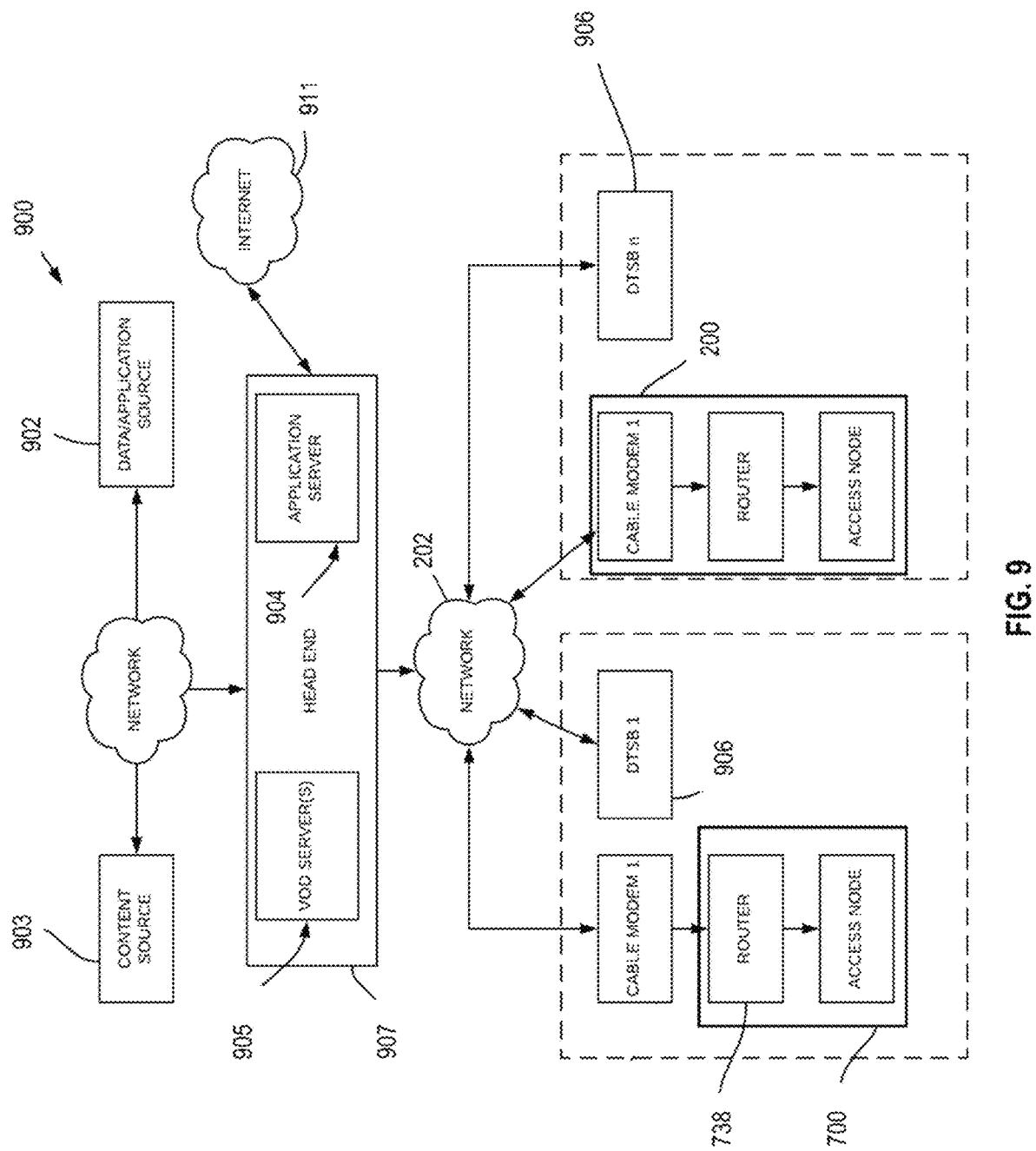
FIG. 9 is a functional block diagram illustrating an exemplary hybrid fiber network configuration useful with the multi-processor user device (e.g., CPE or cable modem) of the present disclosure.

FIG. 9 illustrates a typical service provider network configuration useful with the enhanced CPE device architecture and methods described herein.

As opposed to an unmanaged network, the managed service-provider network 900 of FIG. 9 advantageously allows, inter alia, testing and configuration control of the client devices (e.g., DSTBs 906, cable modems, gateways 200, wireless access node(s) and routers 700, or yet other apparatus at each premises).

In certain embodiments, the service provider network also advantageously permits the aggregation and/or analysis of subscriber-, device-, and/or account-specific data (including inter alia, particular CPE associated with such subscriber or accounts) as part of the provision of testing and configuration control services described herein. As but one example, device specific IDs (e.g., MAC address or the like) can be cross-correlated to MSO subscriber data maintained at e.g., the network headend(s) so as to permit or at least facilitate, among other things, (i) user authentication; (ii) user premises configuration and capabilities, including with respect to IoT devices installed, and (iii) determination of subscription level, and hence subscriber privileges and access to features. For instance, in one variant, any configuration changes to the user's devices to be implemented by the cloud manager (see FIG. 10A) are first authorized via the aforementioned mechanisms, which may verify the type of user device in service with a particular premises or account, its current firmware version, the types of features which the user is authorized to receive, etc.

The premises wireless access point and router 700 (e.g., WLAN) can be coupled to the bearer managed network via, e.g., a cable modem termination system (CMTS) and associated local DOCSIS cable modem (CM) within the gateway 200, a wireless bearer medium (e.g., an 802.16 WiMAX or CBRS or 3GPP xNB system used as a backhaul), a fiber-based system such as FiOS or similar, a third-party medium which the managed network operator has access to (which may include any of the foregoing), or yet other means.

The various components of the exemplary embodiment of the network 900 include (i) one or more data and application origination sources 902; (ii) one or more content sources 903, (iii) one or more application servers 904; (iv) one or more VOD servers 905 (v) one or more enhanced cable modems 200, (vii) one or more routers 913, and (viii) one or more enhanced wireless access nodes 700 (which may or may not include an embedded cable modem and router). A simple architecture comprising one of each of certain components 902, 903, 904, 905, 200, 913, 700 is shown in FIG. 9 for simplicity, although it will be recognized that comparable architectures with multiple origination sources, distribution servers, VOD servers, and/or client devices (as well as different network topologies) may be utilized consistent with the present disclosure. For example, the headend 907 may include (not shown) a billing module, subscriber management system (SMS) and client/CPE configuration management module, cable modem termination system (CMTS) and OOB system, as well as LAN(s) placing the various components in data communication with one another. The headend may further include a conditional access system (CAS) and a multiplexer-encrypter-modulator (MEM) coupled to the HFC network 202 adapted to process or condition content for transmission over the network acquired from various sources. Typically, the channels being delivered from the headend 907 to the client devices/CPE ("downstream") are multiplexed together in the headend, and sent to neighborhood hubs.

FIG. 10 illustrates another exemplary network architecture for the delivery of packetized content that may be utilized consistent with the present disclosure. In addition to on-demand and broadcast content (e.g., video programming), the system of FIG. 10 may deliver Internet data services using the Internet protocol (IP), although other protocols and transport mechanisms of the type well known in the digital communication art may be substituted. The network architecture 1000 of FIG. 10 generally comprises a managed content distribution network having one or more local headends 1007 in communication with at least one hub 1010 via an optical ring 1011. The distribution hub 1010 is able to provide content to various user devices, client devices such as DSTBs 1006, and access point devices 700, via a network.

Various content sources 1003, 1004 are used to provide content to a content server 1002. For example, content may be received from a local, regional, or network content library. Alternatively, content may be received from linear analog or digital feeds, as well as third party content sources. Internet content sources 1009 (such as e.g., a web server) provide internet content to a packetized content server 1004. Other IP content may also be received at the packetized content server 1004, such as voice over IP (VoIP) and/or IPTV content. Content may also be received from subscriber and non-subscriber devices (e.g., a PC or smartphone-originated user made video). In one embodiment, the functionality of both the content server 1002 and packetized content server 1004 may be integrated into a single server entity.

Individual client devices 1006 of the implementation of FIG. 10 may be configured to monitor the particular assigned RF channel (such as via a port or socket ID/address, or other such mechanism) for IP packets intended for the subscriber premises/address that they serve.

In the switched digital variant, the IP packets associated with Internet services are received by the edge switch 1014 (which is controlled by a management process 1020 based on, e.g., operational or other considerations), and forwarded to the cable modem termination system (CMTS) 1018. The CMTS examines the packets, and forwards packets intended for the local network to the edge switch. Other packets are in one variant discarded or routed to another component. As an aside, a cable modem is used to interface with a network counterpart (e.g., CMTS) so as to permit two-way broadband data service between the network and users within a given service group, such service which may be symmetric or asymmetric as desired (e.g., downstream bandwidth/capabilities/configurations may or may not be different than those of the upstream).

The edge switch forwards the packets receive from the CMTS to the QAM modulator, which transmits the packets on one or more physical (QAM-modulated RF) channels to the client devices. The IP packets are typically transmitted on RF channels that are different than the RF channels used for the broadcast video and audio programming, although this is not a requirement. As noted above, the client devices are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 1016. According to this embodiment, all of the content is delivered on DOCSIS channels, which are received by a premises devices in communication therewith. The client devices may be configured to receive IP content directly without need of the gateway or other intermediary.

The IP-packet content in the architecture of FIG. 10 is transmitted to subscriber devices via the universal edge QAM 1016 and the edge network 1074. The IP video ("simulcast") content is presented to client devices capable of receiving content over the DOCSIS QAMs. For example, the aforementioned gateway device 330 (as well as an advanced client device 1006a such as an IP-enabled DSTB) may receive the IP simulcast.

In the illustrated embodiment, the AP device 700 serves as a wireless gateway to the IP content for other client devices 1036.

In parallel with (or in place of) the foregoing delivery mechanisms, the MSO backbone 1012 and other network components can be used to deliver packetized content to the user's mobile end-user device (EUD) 1040 via non-MSO networks. For example, "OTT" (over-the-top) content can be ingested, stored within the MSO's network infrastructure, and delivered to the user's mobile end-user device via an interposed ISP (Internet Service Provider) network and public Internet 111 (e.g., at a local coffee shop, via a Wi-Fi AP connected to the coffee shop's ISP via a modem, with the user's IP-enabled end-user device utilizing an Internet browser or MSO/third-party app to stream content according to an HTTP-based approach).

Moreover, the MNO network 1045 (e.g. 4G/5G network) is connected to the MSO backbone 1012. The exemplary MNO infrastructure or domain includes a number of 3GPP xNBs (e.g., eNBs or gNBs) 1047 as shown, thereby providing 3GPP 4G/5G coverage to authorized users of the MNO network via e.g., their enhanced UE 800. As such, the MSO-configured UE 800 is also accessible to the cloud manager for e.g., firmware testing, updates, configuration changes (e.g., unlicensed spectrum assignment shifts, such as for use of CBRS spectrum by the MSO), etc.

FIG. 10A illustrates one configuration useful for remote communication with deployed client devices such as gateways 200, APs 700, DTSBs, or other devices configured according to the various aspects of the present disclosure. As shown, a cloud manager entity 1050 (which may be disposed at the MSO headend, a hub site, or operated by a third party or proxy) is provided which is configured to establish communication with the target client device via the previously described software stack modifications thereto (i.e., the OpenWrt layer with callable APIs of the HAL 231 of the host processor 204 of the gateway 200). As such, the remote entity 1050 (which may be manually operated by a human, or alternatively automated in whole or part) is used to access particular ones of the functional "modules" previously described for testing, inspection, and/or configuration. In one exemplary implementation, the remote manager process accesses the target device stack via UDP and/or TCP port or IP address of the device.

Methodology

Figure 11:
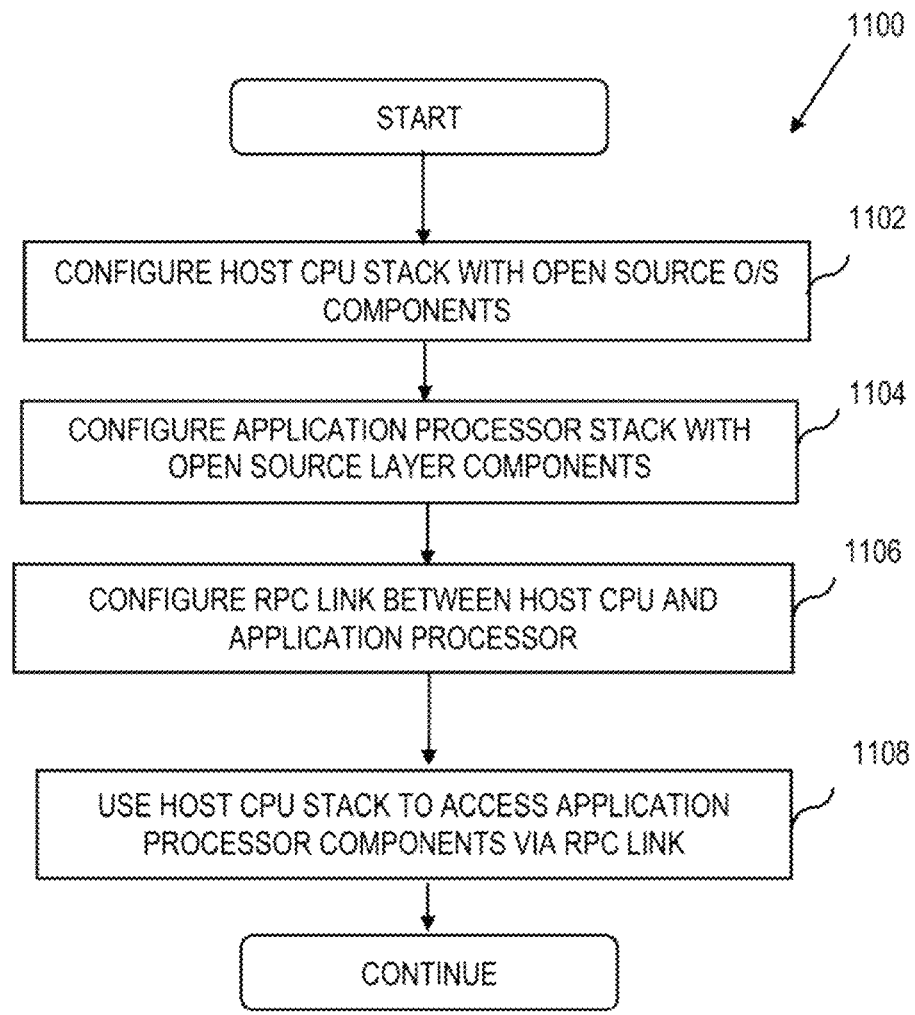
FIG. 11 is a logic flow diagram illustrating of an exemplary method for providing inter-processor communications according to the present disclosure.

Referring to FIG. 11, one embodiment of a method of enabling inter-processor communication via a communication protocol between the Host CPU and application processors is described.

As shown, the method 1100 first configures the Host CPU stack with open-source (e.g., OpenWrt) OS components, including a platform-generic HAL and RPC agent.

Next, per step 1104, the applications processor (e.g., ARM core) is configured such that its protocol stack includes at least a HAL and a complementary RPC agent to that of the Host CPU.

Next, per step 1106, the RPC link between the Host CPU and application processor is configured, such as by specification of UDP port/IP address information which enables use of an RPC protocol.

Lastly, per step 1108, the configured RPC link is used by the Host CPU to issue requests for data (e.g., relating to underlying hardware components associated with the application processor) to the RPC agent on the application processor, the latter which uses the HA: of the application processor to access the hardware layer data requested and return it via the RPC link to the Host CPU.

Figure 12:
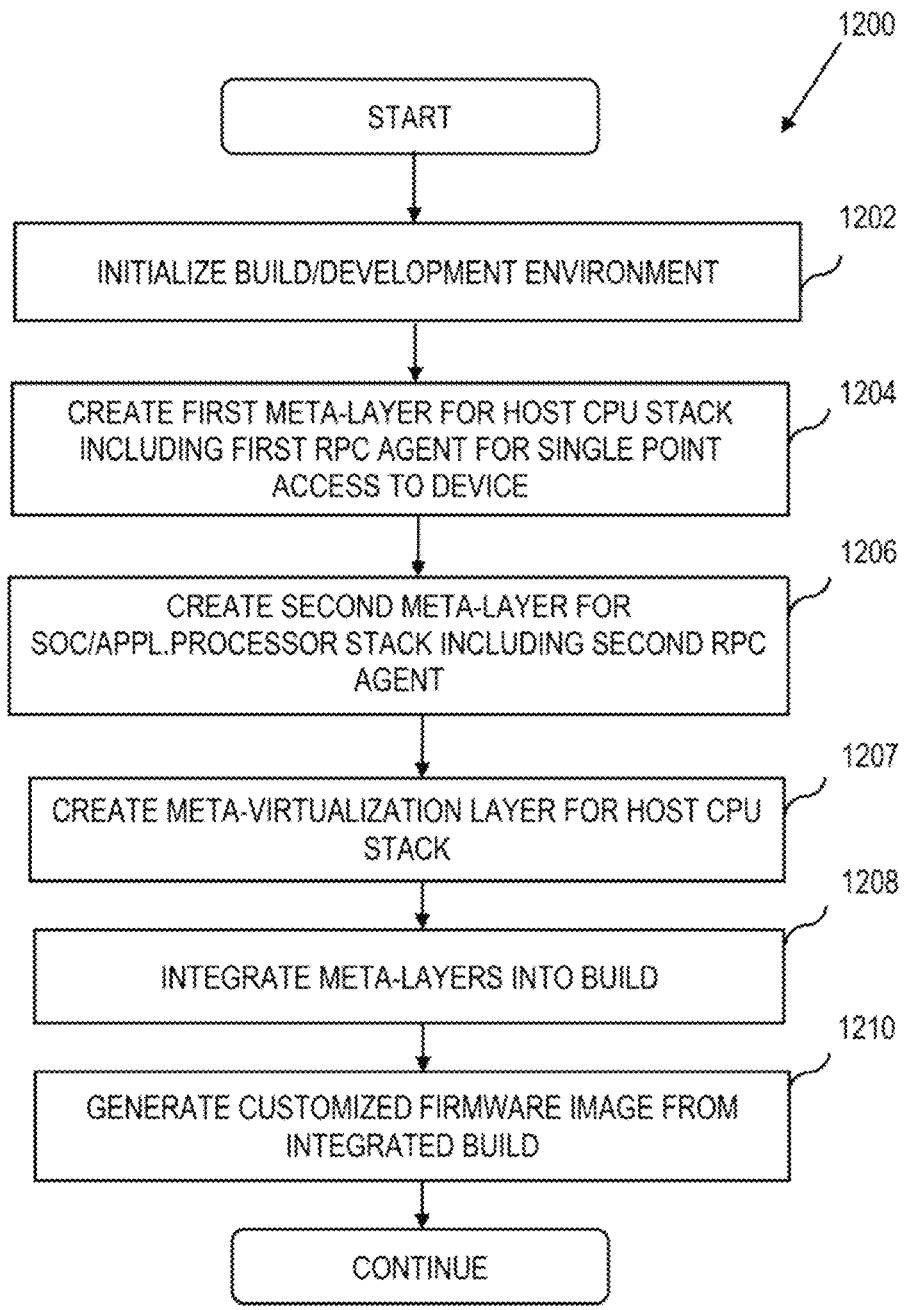
FIG. 12 is a logic flow diagram illustrating of an exemplary method for development of a single-point software stack according to the present disclosure.

Referring now to FIG. 12, one embodiment of a method of developing a single-point software stack according to the present disclosure is shown and described.

In the illustrated embodiment, the method 1200 is based on the exemplary Yocto framework as previously described herein, although it will be appreciated that other frameworks can be used consistent with the method.

As shown, the build environment is first initialized per step 1202. Next, per step 1204, a first meta-layer (e.g., meta-MSO) for use on the Host CPU (e.g., Atom) stack is created. This meta-layer includes recipes for webUI and the atom-rpc-agent software components.

Next, per step 1206, the second meta-layer (e.g., meta-MSO-OEM) for the ARM stack is created, which includes the recipes for a cable modem tuner, LED patch, and the arm-rpc-agent.

Next, per step 1207, the third-layer (e.g., meta-virtualization) for the Atom stack is created, which includes recipes how to build the desired app such as iPerf speed test in a container (please add to FIG. 12).

Next, per step 1208, the SoC vendor SDKs and Yocto build environment are integrated with the three meta-layers of steps 1204, 1206, and 1207 with the Yocto build tool 311 (bitbake) used to generate the customized OpenWrt firmware image (step 1210).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computerized apparatus, comprising:
   a first processor apparatus, wherein the first processor apparatus is part of a host integrated circuit (IC);
   a first communication agent integrated in a software stack of the first processor apparatus;
   a second processor apparatus, wherein the second processor apparatus is part of a cable modem (CM) integrated circuit (IC);
   a second communication agent integrated in a software stack of the second processor apparatus; and
   a memory device in communication between the first processor apparatus and the second processor apparatus;
   wherein the first and second communication agents are configured to use a common protocol to enable extraction of data from one or more hardware components associated with the second processor apparatus by the first processor apparatus, the extraction of the data from the one or more hardware components comprising extraction of data relating to a CM data interface of the computerized apparatus, the data relating to the CM data interface utilized to enable the host IC to actively support CM functionality.

2. The computerized apparatus of claim 1, wherein the computerized apparatus further comprises gateway apparatus for use in a managed content distribution network, and the one or more hardware components comprise a radio frequency (RF) modem apparatus configured to interface with the managed content distribution network.

3. The computerized apparatus of claim 2, wherein the extraction of the data is configured to be conducted via a network-based software process of the managed content distribution network, the network-based software process configured to access a meta-layer of the first processor apparatus via at least one of a UDP (user datagram protocol) port, TCP (transmission control protocol) port, or IP (Internet Protocol) address.

4. The computerized apparatus of claim 1, wherein the extraction of the data from the one or more hardware components associated with the second processor apparatus comprises use of a platform-specific layer hardware abstraction layer in the second processor apparatus to access the one or more hardware components.

5. The computerized apparatus of claim 4, wherein the platform-specific layer hardware abstraction layer is configured to decouple the one or more hardware components from one or more software components above the platform-specific layer hardware abstraction layer.

6. The computerized apparatus of claim 4, wherein the extraction of the data from the one or more hardware components associated with the second processor apparatus by the first processor apparatus comprises a comprises a pull of the data from the one or more hardware components by the first processor apparatus on a periodic basis.

7. A computerized method for inter-processor communication, comprising:
  disposing a first software communication agent on a first processor apparatus, the first processor apparatus having a first operating system (OS), the first software communication agent compatible with the first OS, the first OS comprising a platform-generic wrapper function layer;
  disposing a second software communication agent on a second processor apparatus, the second software communication agent compatible with the first OS, and wherein the second processor apparatus (i) is in data communication with the first processor apparatus, and (ii) comprises a second operating system (OS) and a platform-specific hardware abstraction layer; and
  using the first OS and the first software communication agent to invoke a communications protocol to request data from the second processor apparatus via the second software communication agent; and
  using one or more wrapper functions in the platform-generic wrapper function layer of the first processor apparatus to request specific data from one or more drivers below the platform-specific layer hardware abstraction layer in the second processor apparatus.

8. The computerized method of claim 7, wherein the first and second software communication agents comprise RPC (remote procedure call)-enabled agents, and the using the first OS and the first software communication agent to invoke the communications protocol comprises invoking use of an RPC-based protocol using user datagram protocol (UDP) sockets associated with the first and second processor apparatus.

9. The computerized method of claim 7, wherein the interprocessor communication supports at least one configuration change to the second processor apparatus or one or more hardware components associated therewith, and the computerized method further comprises transmitting a configuration change command to the first OS via a meta-layer of the first OS.

10. Non-transient storage apparatus comprising a storage medium having a plurality of computer programs disposed thereon, the plurality of computer programs comprising a software architecture for use in a computerized device, the software architecture comprising:

an operating system (OS) having a plurality of components operative to execute on a first processor of the computerized device; and
  a software layer having a plurality of components operative to execute on a second processor of the computerized device, the software layer being communicative with the OS via respective first and second agent processes;
  wherein:
    the OS is configured to provide a plurality of services, the plurality of services comprising at least one service configured to invoke a communications protocol between the first and second agent processes so as to (i) obtain hardware data from the second processor, and (ii) enable modification, directly by an operator of a managed content delivery network, of at least a portion of code associated with the second processor; and
    the modification, directly by the operator of the managed content delivery network, of at least the portion of the code associated with the second processor, comprises a modification performed on a per-function basis so as to obviate a complete re-flash of firmware associated with the second processor.

11. The non-transient storage apparatus of claim 10, further comprising a plurality of software containers used to modularize respective ones of the plurality of services to maintain abstraction between the plurality of services and the OS, the first processor, or the second processor.

12. The non-transient storage apparatus of claim 11, wherein the plurality of software containers comprise a plurality of unprivileged containers.

13. The non-transient storage apparatus of claim 12, wherein the plurality of unprivileged containers are configured to be created at boot-up of the computerized device.

14. The non-transient storage apparatus of claim 13, wherein the computerized device comprises a gateway apparatus having a modem integrated circuit (IC) and a host IC, the first processor being part of the host IC and the second processor being part of the modem IC.

15. The non-transient storage apparatus of claim 10, wherein the plurality of services comprise at least access to a plurality of hardware components of the computerized device via at least an abstraction layer operative on the second processor.

16. The non-transient storage apparatus of claim 10, wherein the hardware data comprises data relating to at least one hardware component supported by the second processor.

17. The non-transient storage apparatus of claim 16, wherein the data relating to at least one hardware component supported by the second processor comprises data relating to a cable modem (CM) data interface of the computerized device.

18. The non-transient storage apparatus of claim 17, wherein the plurality of services comprises invocation of the communications protocol between the first and second agent processes so as to enable modification of at least a portion of a configuration of the CM data interface.

19. The non-transient storage apparatus of claim 10, wherein the first and second agent processes are configured to use a common protocol to enable extraction of data from one or more hardware components associated with the second processor by the first processor.

20. The non-transient storage apparatus of claim 19, wherein the extraction of data is configured to be conducted via a network-based software process of the managed content delivery network, the network-based software process configured to access a meta-layer of the first processor via at least one of a UDP (user datagram protocol) port, TCP (transmission control protocol) port, or IP (Internet Protocol) address.

* * * * *